Figure 1:
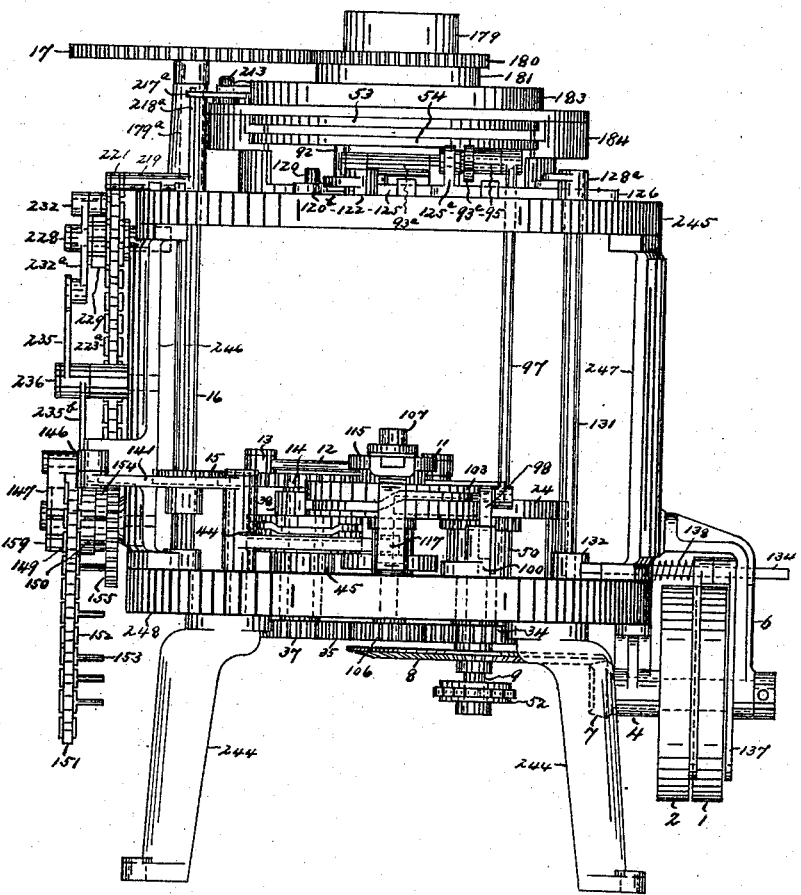

(No Model.)

W. L. & A. T. CATHCART.
CIRCULAR KNITTING MACHINE.

No. 550,591.  9 Sheets—Sheet 1.

Patented Dec. 3, 1895.

WITNESSES:

INVENTORS
William L. Cathcart
Alexander T. Cathcart
BY
Macleod Calver & Randall
ATTORNEYS.

(No Model.) 9 Sheets—Sheet 2.
W. L. & A. T. CATHCART.
CIRCULAR KNITTING MACHINE.
No. 550,591. Patented Dec. 3, 1895.
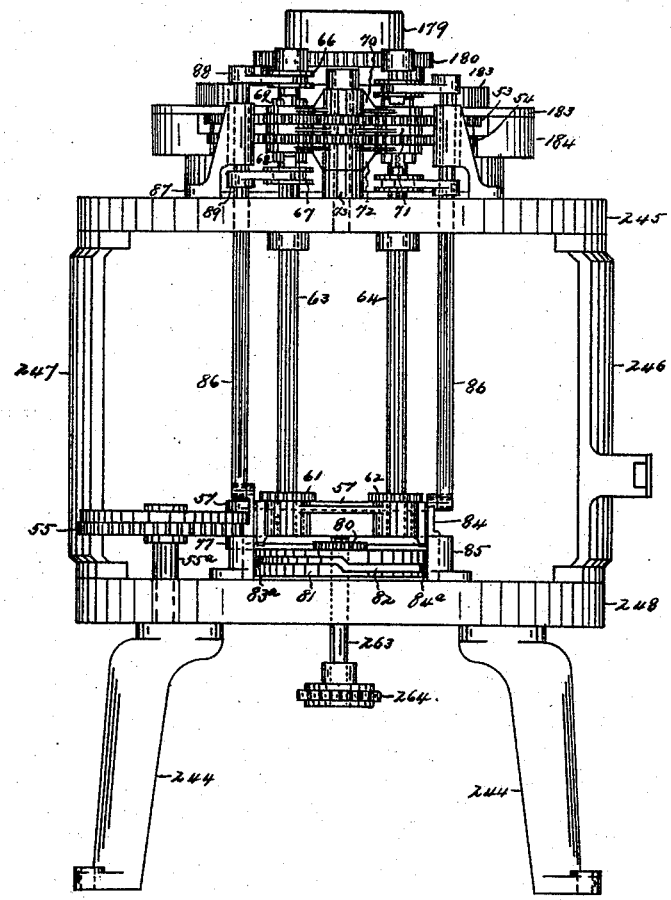
Fig. 1ª.
WITNESSES:
Arthur T. Randall.
Alice H. Morrison
INVENTORS.
William L. Cathcart
Alexander T. Cathcart
BY
Macleod Calver & Randall
ATTORNEYS.

(No Model.) 9 Sheets—Sheet 3.
W. L. & A. T. CATHCART.
CIRCULAR KNITTING MACHINE.
No. 550,591. Patented Dec. 3, 1895.
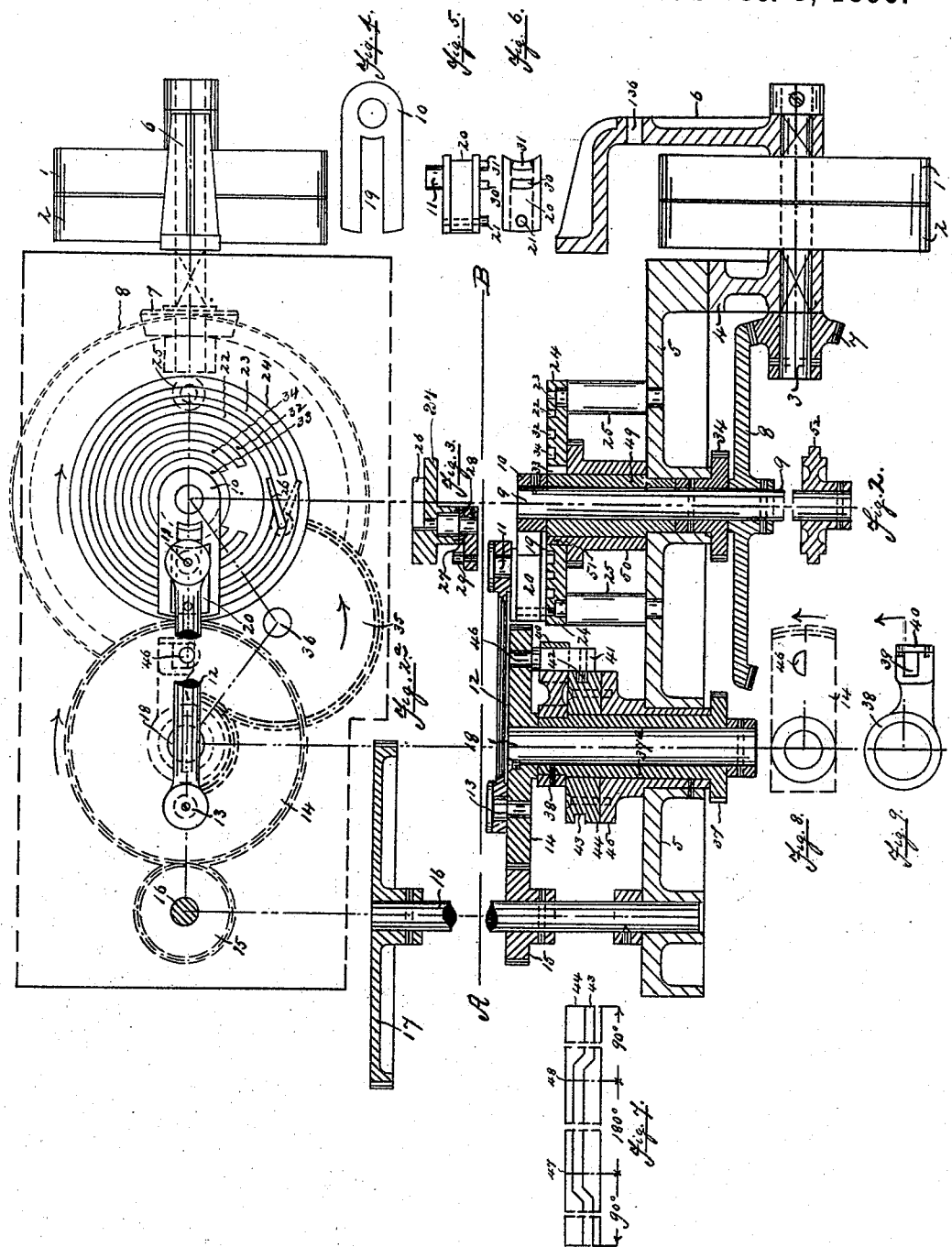
WITNESSES:
Arthur T. Randall
Alice H. Morrison
INVENTORS.
William L. Cathcart
Alexander T. Cathcart
BY
Macleod Calver & Randall
ATTORNEYS.

(No Model.) 9 Sheets—Sheet 4.
W. L. & A. T. CATHCART.
CIRCULAR KNITTING MACHINE.
No. 550,591. Patented Dec. 3, 1895.
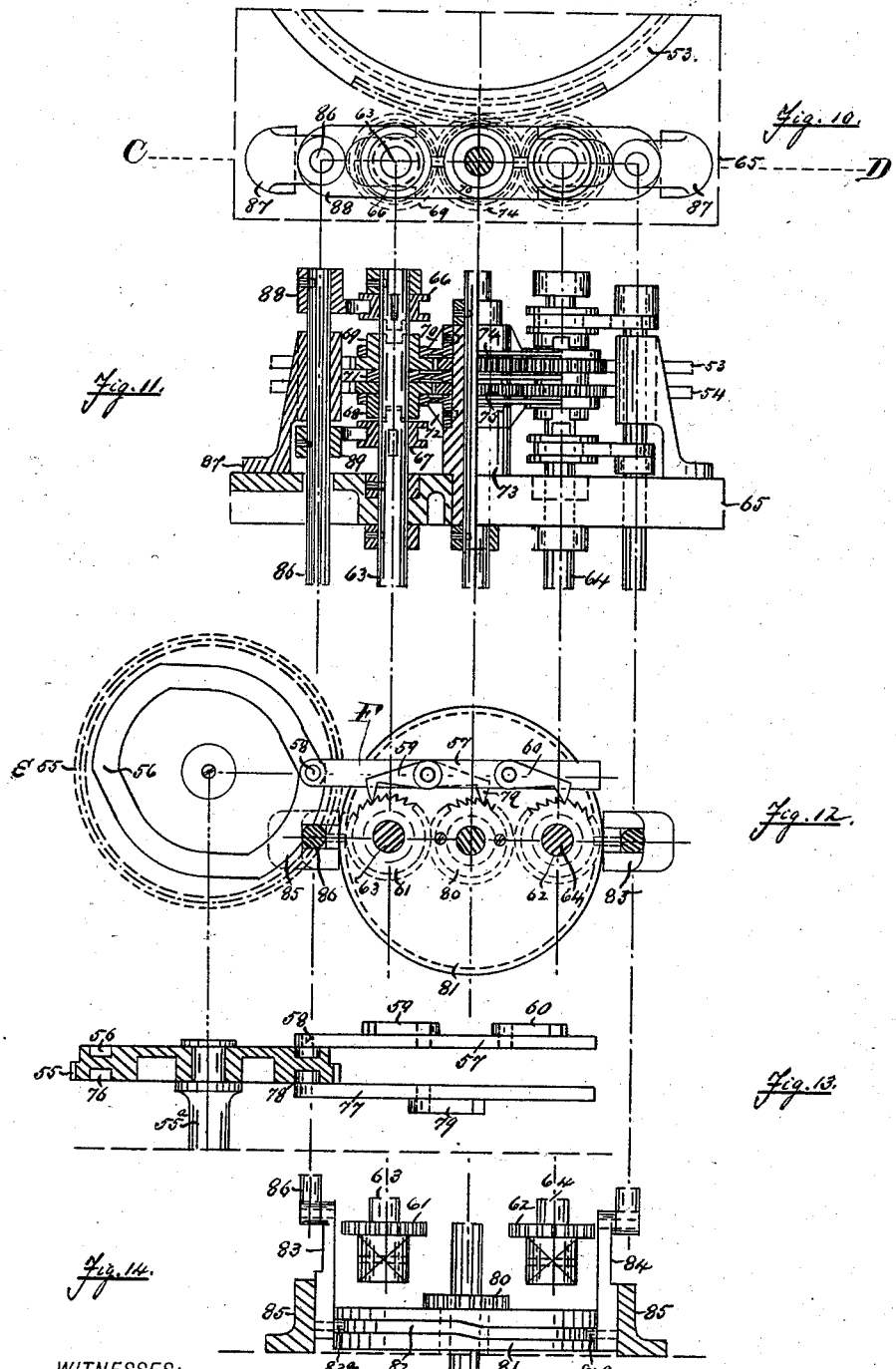

(No Model.) 9 Sheets—Sheet 5.
W. L. & A. T. CATHCART.
CIRCULAR KNITTING MACHINE.
No. 550,591. Patented Dec. 3, 1895.
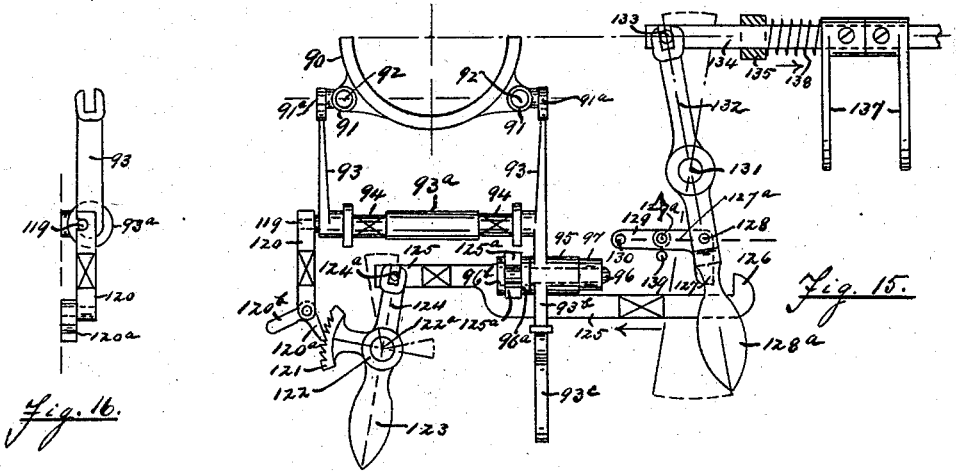
Fig. 15.
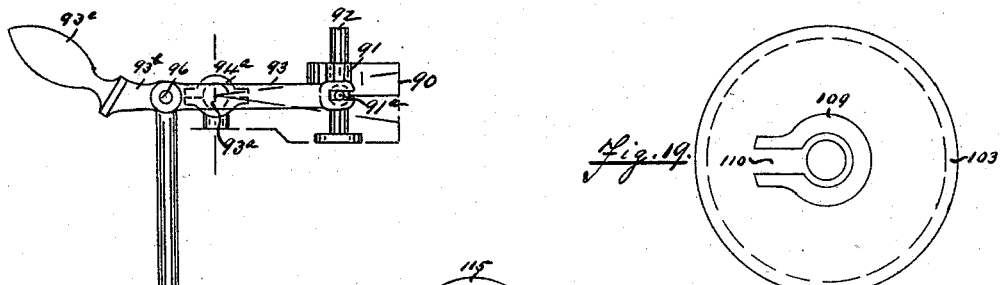
Fig. 16.
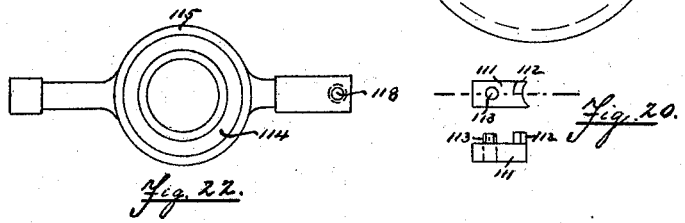
Fig. 19.
Fig. 22.
Fig. 20.
Fig. 21.
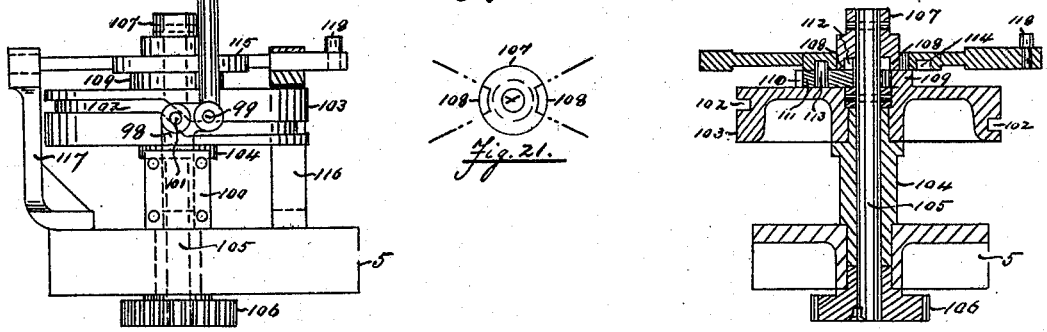
Fig. 17.
Fig. 18.
WITNESSES:
Arthur T. Randall
Alice H. Morrison
INVENTORS
William L. Cathcart
Alexander T. Cathcart
BY
Macleod Calvert Randall
ATTORNEYS.

(No Model.) 9 Sheets—Sheet 6.
W. L. & A. T. CATHCART.
CIRCULAR KNITTING MACHINE.
No. 550,591. Patented Dec. 3, 1895.
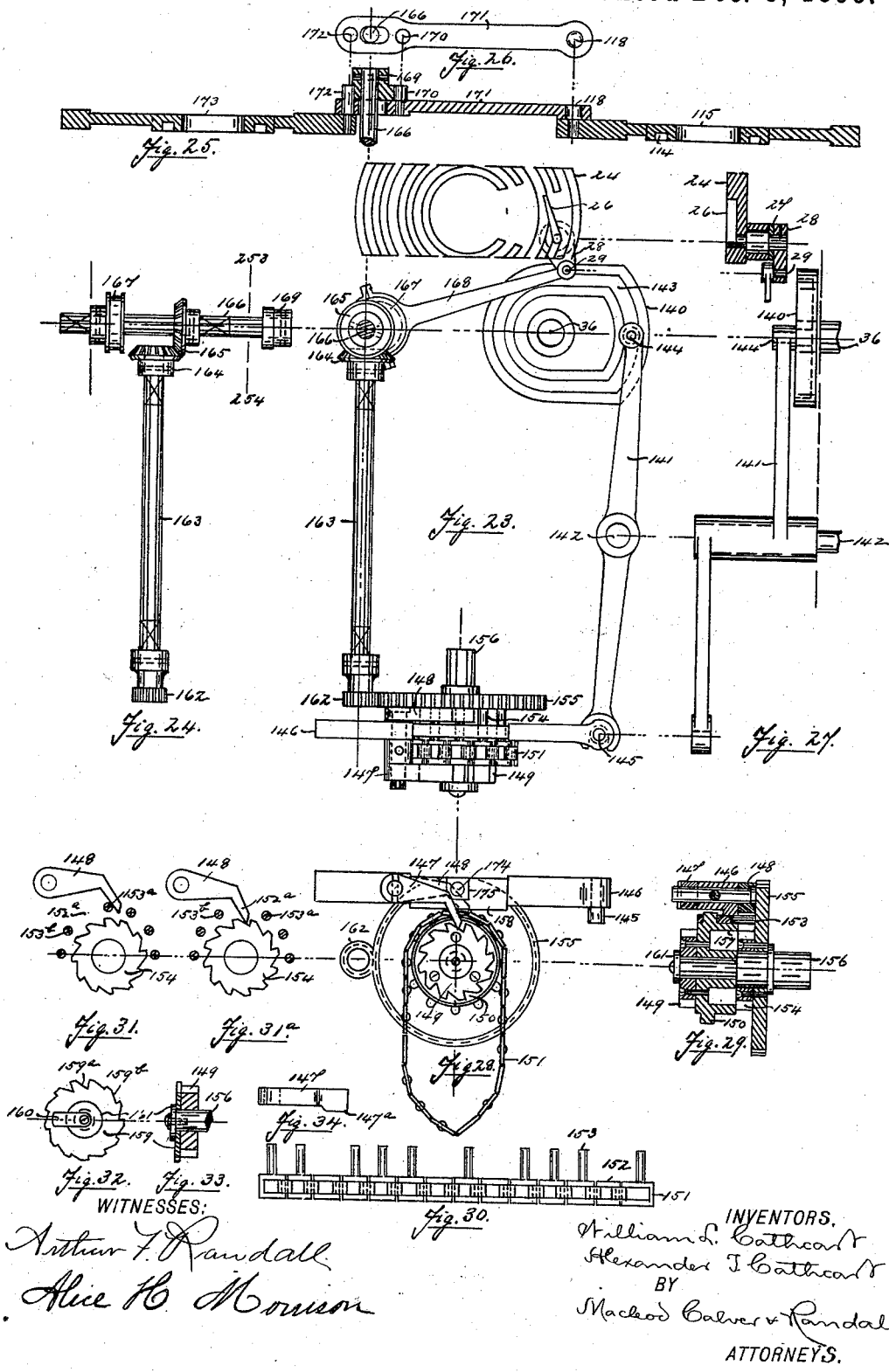
WITNESSES:
Arthur F. Randall
Alice H. Morrison
INVENTORS.
William L. Cathcart
Alexander T. Cathcart
BY
Macleod Calver & Randall
ATTORNEYS.

(No Model.) 9 Sheets—Sheet 7.
W. L. & A. T. CATHCART.
CIRCULAR KNITTING MACHINE.
No. 550,591. Patented Dec. 3, 1895.
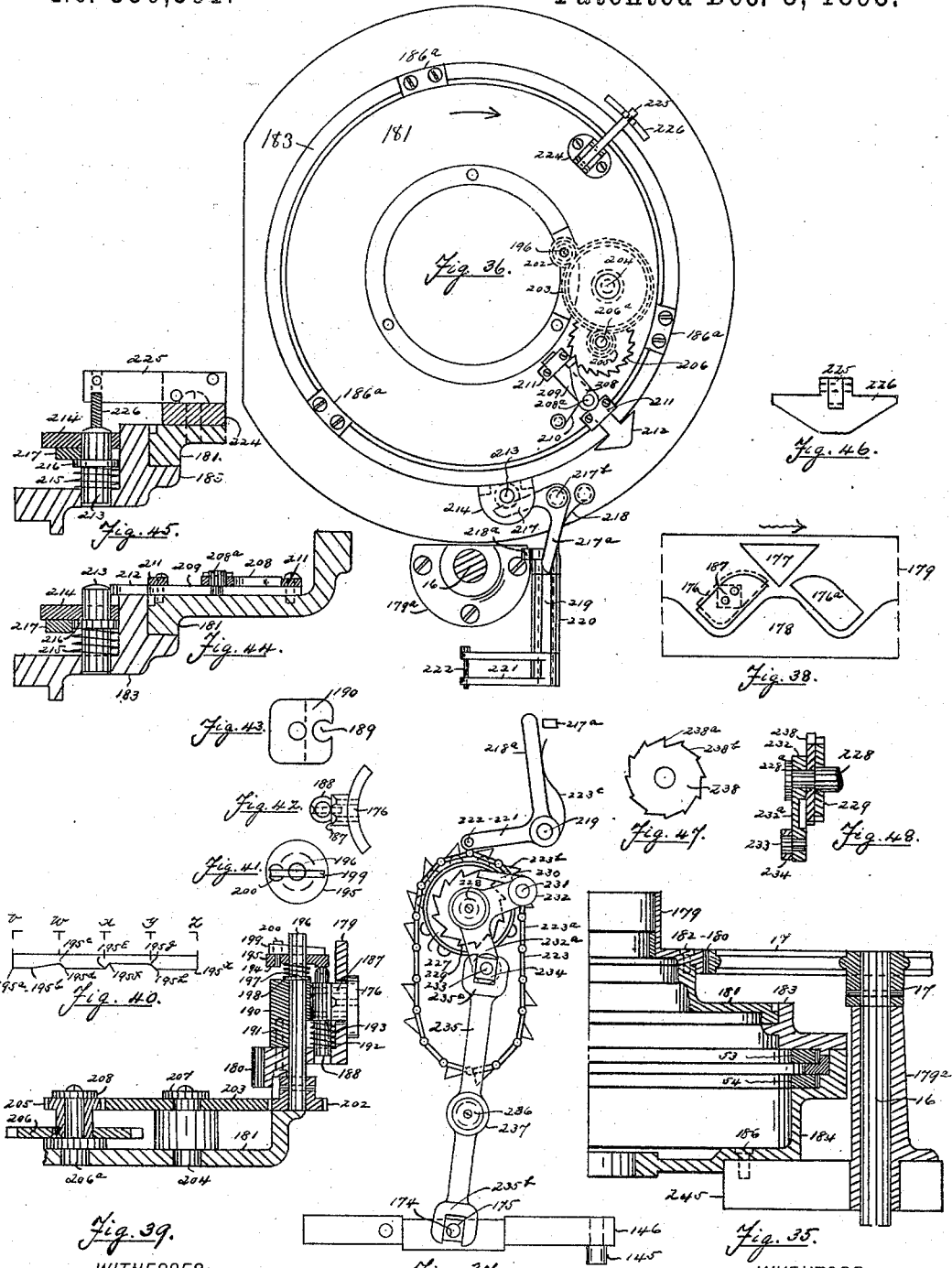

(No Model.) 9 Sheets—Sheet 8.
W. L. & A. T. CATHCART.
CIRCULAR KNITTING MACHINE.

No. 550,591. Patented Dec. 3, 1895.

WITNESSES:
Arthur T. Randall
Alice H. Morrison

INVENTORS.
William L. Cathcart
Alexander T. Cathcart
BY
Macleod Calver & Randall
ATTORNEYS.

(No Model.)
W. L. & A. T. CATHCART.
CIRCULAR KNITTING MACHINE.
No. 550,591. Patented Dec. 3, 1895.
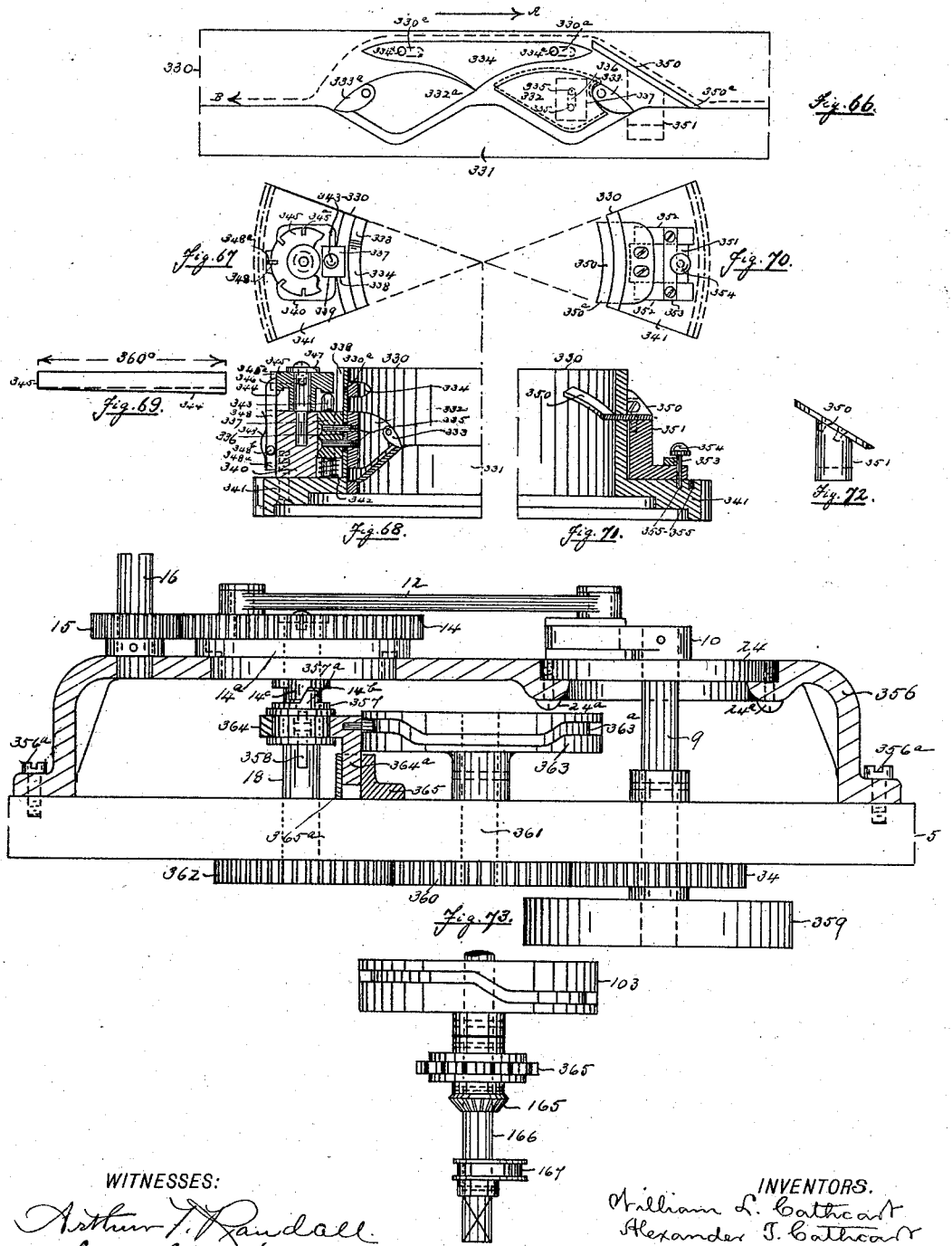

UNITED STATES PATENT OFFICE.

WILLIAM L. CATHCART AND ALEXANDER T. CATHCART, OF GWYNEDD, ASSIGNORS TO THE RENFREW MANUFACTURING COMPANY, LIMITED, OF PHILADELPHIA, PENNSYLVANIA.

CIRCULAR-KNITTING MACHINE.

SPECIFICATION forming part of Letters Patent No. 550,591, dated December 3, 1895.

Application filed September 21, 1894. Serial No. 523,752. (No model.)

*To all whom it may concern:*

Be it known that we, WILLIAM L. CATHCART and ALEXANDER T. CATHCART, citizens of the United States, residing at Gwynedd, in the county of Montgomery and State of Pennsylvania, have invented certain new and useful Improvements in Circular-Knitting Machines, of which the following is a specification, reference being had therein to the accompanying drawings.

This invention relates to circular-knitting machines, such as are employed for the production of stockings. It is an improvement on the machines presented in United States Letters Patent No. 395,214, granted December 25, 1888, No. 410,071, granted August 27, 1889, and No. 472,029, granted April 5, 1892, to which reference may be had.

The invention consists in certain novel features of construction and combinations of parts, all as first will be described with reference to the accompanying drawings, and then will be particularly pointed out and distinctly defined in the claims at the close of this specification.

Figure 1 of the drawings, Sheet 1, is a view in front elevation of a knitting-machine embodying our present improvements, the indicating and yarn-inserting mechanisms being omitted, as well as certain small details, for the sake of clearness. Fig. 1ª, Sheet 2, is a view in rear elevation of the said machine, showing chiefly the indicating mechanism and connected parts. Fig. 2, Sheet 3, is a view in vertical section of the driving mechanism for the cam-cylinder. Fig. 2ª, Sheet 3, is a view in top plan of said driving mechanism below line A B, Fig. 2. Fig. 3, Sheet 3, is a view showing certain parts in vertical section, the line of section passing through the switch-plate and the switch being shown in full. Fig. 4, Sheet 3, is a view in top plan of the expanding crank, omitting the crank-block. Fig. 5, Sheet 3, is a view in side elevation of said crank-block. Fig. 6, Sheet 3, is a view in bottom plan of said crank-block. Fig. 7, Sheet 3, is a development of the clutch-cam of the rotary driving mechanism. Fig. 8, Sheet 3, is a view in bottom plan of part of the crank-gear carrying one member of the clutch of the rotary driving-gear. Fig. 9, Sheet 3, is a view in bottom plan of the crank carrying the other member of said clutch. Fig. 10, Sheet 4, is a view in top plan of certain parts of the indicating mechanism which are on and above the table. Fig. 11, Sheet 4, shows, partly in elevation and partly in vertical section, the mechanism represented in Fig. 10, the section being on line C D of Fig. 10. Fig. 12, Sheet 4, is a view in top plan of that part of the indicating mechanism which is on and immediately above the base-plate. Fig. 13, Sheet 4, shows, partly in vertical section and partly in elevation, certain portions of the mechanism represented in Fig. 12, the section being on line E F of Fig. 12. Fig. 14, Sheet 4, shows in rear elevation, partly sectional, the remainder of the mechanism which is represented in plan in Fig. 12. Fig. 15, Sheet 5, is a view in top plan of the stop-off mechanism with portions of the mechanism for reciprocating the jack-holder. Fig. 16, Sheet 5, is a left-side elevation of parts of the mechanism shown in Fig. 15. Fig. 17, Sheet 5, is a right-side elevation, partly sectional, of the jack-holder and its reciprocating mechanism. Fig. 18, Sheet 5, is a view in vertical section of a portion of the mechanism shown in Fig. 17, looking toward the right-hand side in the latter figure. Fig. 19, Sheet 5, is a view in top plan of the jack-holder cam. Fig. 20, Sheet 5, shows in top plan and right elevation the driving slide for the jack-holder cam. Fig. 21, Sheet 5, is a view in bottom plan of the driving-disk for revolving the jack-holder cam. Fig. 22, Sheet 5, is a bottom plan of the eccentric slide for working the jack-holder cam. Fig. 23, Sheet 6, shows in top plan the primary pattern-chain, its actuating mechanism, and a portion of the parts operated by it, the sectional plan of shaft 166 being taken on the line 253 254, Fig. 24. Fig. 24, Sheet 6, shows in vertical elevation the shafting which is shown in Fig. 23 as operated by the primary pattern-chain. Fig. 25, Sheet 6, is a view in vertical section, showing one of said shafts with the connections for setting in motion the jack-holder, yarn-splicing, and take-up mechanisms. Fig. 26, Sheet 6, is a view in top plan of the link shown in Fig. 25. Fig. 27, Sheet 6, shows in front elevation, partly sectional, a portion of the mechanism which is shown in Fig. 23. Fig. 28, Sheet 6, shows in side elevetion a portion of the mechanism which is shown in Fig. 23. Fig. 29, Sheet 6, is a view in central vertical section through the mechanism which is shown in Fig. 28. Fig. 30, Sheet 6, is a view in top plan of a portion of the primary pattern-chain. Figs. 31 and 31ᵃ, Sheet 6, are side views, partly sectional, showing the primary chain in different positions relatively to its pawl. Fig. 32, Sheet 6, is a view in side elevation of the masked ratchet which is used with the primary chain. Fig. 33, Sheet 6, is a view in vertical section through the masked and driving ratchets which are employed in connection with the primary pattern-chain. Fig. 34, Sheet 6, shows in top plan the pawl for engaging the masked and driving ratchets. Fig. 35, Sheet 7, is a view in vertical section through the cylinder-plate and adjacent driving mechanism, omitting unnecessary parts and showing the connection between the cam-cylinder and the said driving mechanism. Fig. 36, Sheet 7, is a view in plan of the parts shown in Fig. 35, omitting the cam-cylinder and its driving gear-wheel, and including, also, a portion of the shaping mechanism. Fig. 37, Sheet 7, is a view in elevation of the secondary or shaping pattern-chain with the mechanism for driving it and for transmitting motion from it. Fig. 38, Sheet 7, is a development of a cam-cylinder to which is applicable the shaping mechanism herein set forth. Fig. 39, Sheet 7, is a view in vertical section through the cam-cylinder and through Fig. 36 on the irregular line of the parts 196 204 206 in said figure. Fig. 40, Sheet 7, is a development of the circumference of the cam-disk of the shaping mechanism. Fig. 41, Sheet 7, shows in top plan the said disk, its supporting-shaft, and its tapering key. Fig. 42, Sheet 7, shows in top plan the stitch-cam of the shaping mechanism with its guiding attachment. Fig. 43, Sheet 7, shows in top plan the guide-block of the shaping mechanism. Fig. 44, Sheet 7, is a view in radial section through the supporting-flange and cap of the cylinder-plate, showing the method of operating the pawl of the shaping mechanism. Fig. 45, Sheet 7, is a view in vertical radial section, as above, showing the means of rendering said pawl inoperative. Fig. 46, Sheet 7, shows in front elevation the depressing-cam 226 and its carrier-bar. Fig. 47, Sheet 7, shows in plan view the masked ratchet for use with the secondary pattern-chain. Fig. 48, Sheet 7, is a view in vertical section through the masked and driving ratchets and their pawl-cranks. Fig. 49, Sheet 8, shows in side elevation, partly sectional, the yarn-splicing and take-up mechanisms. Fig. 50, Sheet 8, shows in top plan a portion of the mechanism represented in Fig. 49. Fig. 51, Sheet 8, shows in side elevation a section through the take-up rock-shaft and the hub of the take-up crank for the reinforcing-thread. Fig. 52, Sheet 8, shows in bottom plan the eccentric slide for indicating the motion of the cam-shaft of the splicing and take-up mechanisms. Fig. 53, Sheet 8, shows in bottom plan the driven disk of the said cam-shaft. Fig. 54, Sheet 8, shows in top plan the driving-disk of the said cam-shaft. Fig. 55, Sheet 8, shows in bottom view and side elevation the lug-slide through which the said cam-shaft is driven. Fig. 56, Sheet 8, shows the inserting-wheel in top plan, and Fig. 57, Sheet 8, shows the said wheel in side elevation. Fig. 58, Sheet 8, shows in top plan, omitting the driving-spring, the primary driving and controlling mechanism for the said inserting-wheel. Fig. 59, Sheet 8, shows in top plan the clamp-opening cam of the inserting mechanism. Figs. 60, 61, and 62, Sheet 8, show in front elevation, partly sectional, the splicing and take-up mechanisms at various stages in their operation. Figs. 63, 64, and 65 show in front elevation various modified forms of plate 283. Figs. 64ᵃ and 65ᵃ show in side and front elevations, respectively, the action of certain of the tension devices. Fig. 66, Sheet 9, shows in development the interior of a cam-cylinder having cam-adjusting and needle-releasing devices applied thereto. Fig. 67, Sheet 9, shows in top plan a segment of a cam-cylinder having applied thereto the cam-adjusting device aforesaid. Fig. 68, Sheet 9, shows in vertical section the parts which are represented in Fig. 67. Fig. 69, Sheet 9, shows in development the adjusting cam-disk of Figs. 67 and 68. Fig. 70, Sheet 9, shows in top plan a segment of a cam-cylinder having applied thereto the needle-releasing devices hereinafter described. Fig. 71, Sheet 9, shows in vertical section the parts which are represented in Fig. 70. Fig. 72, Sheet 9, shows in inner elevation the needle-releasing incline and its guide-block. Fig. 73, Sheet 9, shows in front elevation, partly sectional, a modification of the driving mechanism for the cam-cylinder. Fig. 74, Sheet 9, shows in front elevation a modification which is described hereinafter.

1 and 2, Fig. 1, Sheet 1, and Fig. 2, Sheet 3, are respectively loose and fast pulleys, the latter being fixed to power-shaft 3, which shaft is journaled in bracket 4, secured to base-plate 5, (see Fig. 2, Sheet 3,) and in bracket 6, attached to the side framing, as shown in Fig. 1, Sheet 1. The vertical shaft 9 is revolved by shaft 3 through bevel-gears 7 and 8, engaging each other and pinned, respectively, to shafts 3 and 9. The vertical shaft 18, from which motion is transmitted to cam-cylinder 179, Fig. 1, Sheet 1, and Fig. 1ᵃ, Sheet 2, is revolved or reciprocated by two separate trains of mechanism, both of which are driven by shaft 9 and both thereof acting to revolve the former shaft, while one thereof only acts to reciprocate it. Provision is made for giving, as usual, either a rotary or a reciprocating motion to shaft 18, since in knitting hosiery, as is well understood, the cam-cylinder is revolved for tubular work and is reciprocated for forming heel and toe pouches. Therefore while shaft 9 revolves continuously during the formation of a stocking the shaft 18 and the shaft 16, which is driven therefrom, and the cam-cylinder which is driven from the shaft 16, as explained hereinafter, revolve or reciprocate, according as the character of the fabric requires. The reciprocating mechanism for these shafts 18 and 16 consists of two cranks, one of fixed effective length and the other of variable effective length, and a connecting-link, with also the mechanism for changing the length of the variable crank. Herein the arm of the variable crank is designated 10 and is pinned to the upper extremity of shaft 9. (See more particularly Sheet 3.) Crank-arm 10 carries the crank-pin 11, which through link 12 drives crank-pin 13, fixed in crank-gear 14, fast on shaft 18. It is evident that when the effective length of crank 11 9 is equal to the length of crank 13 18 the shaft 18 will be capable of receiving rotary motion from shaft 9, and it also is evident that if crank 11 9 is the shorter of the two in effective length then while said latter crank revolves the link 12 will transmit only a reciprocating movement to the crank-pin 13 and its connected mechanism.

The mechanism for varying the effective length of crank 11 9 is as follows: The crank-arm 10 is provided with a slot 19, Fig. 4, Sheet 3, forming a guideway for crank-block 20, with which block the pin 11 is made integral, as shown in Fig. 5, Sheet 3. From the under side of said block, and journaled therein, there projects a rotatable "pilot-pin" 21, Figs. 5 and 6, Sheet 3, which pin engages either of the grooves 22 or 23 turned in the circular switch-plate 24, the latter with its grooves being set concentric with shaft 9 and firmly secured by supports 25 25 to base-plate 5. The radial distance of said grooves is such that when pin 21 is in groove 23 the crank 9 11 and crank 18 13 will be equal in effective length, and that when said pin is rotating in groove 22 block 20 will be moved radially inward, the effective length of crank 11 9 will be less than that of crank 13 18, and the latter crank will reciprocate through an arc whose length will depend upon the reduction in effective length of crank 11 9.

In order to change from rotary to reciprocating motion of the cam-cylinder, or vice versa, it is necessary only at predetermined times to deflect pin 21 from either of the grooves 22 or 23 to the other. To effect this deflection there is fitted in a space left open by cutting away a portion of the partition between the grooves a pivoted switch 26, of ordinary type, whose stem (see Fig. 3, Sheet 3) is journaled in switch-plate 24 and a downward extension thereof. The end of said switch is capable of reciprocation from the inner edge of the inner groove 22 to the outer edge of the outer groove 23, as shown by full and dotted positions in Fig. 2ª. The switch maintains the position shown in full lines in said figure during tubular knitting and the position shown in dotted lines during reciprocating knitting, the change in its position being made when a change in the character of the knitting is desired and before the pin 21 in its continuous revolution reaches switch 26. The stem of said switch is shouldered and kept in place vertically by cap 27, bolted to the downward extension of plate 24. There is also secured to said stem a crank 28, provided with crank-pin 29, through connections to which the crank 28 and switch 26 are at predetermined times reciprocated under control of a pattern-chain, as will be herinafter described.

It is evident that in approaching or receding from the dead-points of crank 11 9 the pin 21 would bear the strain of holding the block 20 in its radial position with the mechanism thus far described. While it is possible to make said pin sufficiently strong to resist this strain, it is more convenient for practical and constructive reasons to reinforce the pin. Hence there are made integral with block 20 and projecting downward therefrom the reinforcing-lugs 30 and 31, (shown most clearly in Figs. 5 and 6, Sheet 3,) the lug 30 being turned to the curve of groove 32 and moving in said groove when the block is extended to full throw, and the lug 31 being curved to correspond with groove 33, which groove is really a space between the inner edge of switch-plate 24 and the outer circumference of the bushing 49, which surrounds the shaft 9. (See Figs. 2 and 2ª, Sheet 3.) In the space thus formed and herein denominated "groove" 33 the lug 31 revolves when crank-block 20 is retracted and reciprocating knitting is in progress. The respective lugs have each a working fit in its groove, and may take the entire strain of driving, the pin 21 being then made an easy fit and being used for deflecting only. Between grooves 32 and 33 there is an "idle groove" 34, in which revolves the lug 30 or 31, which is not at the time acting to resist the strain of driving. The partitions between grooves 32 and 34 and 34 and 33 are cut away through about the arc covered by switch 26 in its action, in order that the change of position of the lugs from groove to groove may be effected.

The mechanism thus far described comprises both a reciprocating and a rotary driving-train for shaft 18 and the cam-cylinder which is actuated therefrom; but since single cranks, such as crank 13 18, may fail at times, through lack of momentum, to revolve across the dead-points, we provide auxiliary driving-gear consisting of a rotary driving mechanism to insure continuous circular motion of crank 13 18 when said crank and crank 11 9 are equal in length. This mechanism consists of spur-gear 34, pinned to shaft 9, which engages spur-gear 35, Fig. 2ª, fixed to the parallel shaft 36, the latter engaging a spur-gear 37, formed on the lower extremity of a sleeve 37ª, encircling shaft 18, which sleeve has secured to its upper end the crank 38, said crank therefore revolving in unison with crank-arm 10, since spur-gears 34 and 37 are equal in diameter. Crank 38 (see Fig. 9, Sheet 3) is provided at its outer extremity with a vertical slot 39 and a cap 40, forming a guideway for a cam-block 41, which block is vertically reciprocated, as gear 37 revolves, through a rotatable pin 42, journaled therein and engaging the camway 43 of a vertical cylinder-cam 44. The said cam 44 is bolted to bushing 45, the latter being firmly secured to base-plate 5. The driving-face of block 41 is, as shown in Fig. 9, radial, and it is so adjusted as to be capable when raised of engaging and driving the similar radial surface of a semicircular pin 46, fixed in crank-gear 14, (see Fig. 8,) projecting from the under side thereof and set one hundred and eighty degrees from crank-pin 13. From the construction described it will be observed that when block 41 is raised it engages and drives pin 46, gear 14, and the attached cam-cylinder. A consideration of the rotary and reciprocating movements of gear 14 will show that while it is necessary only that block 41 should engage pin 46 while crank 13 18 is crossing its dead-points no obstacle exists to such engagement through the entire rotary path of gear 14 in tubular knitting, excepting that portion of said path in which during pouch-knitting the pin 46 reciprocates, which arc is for convenience made approximately ninety degrees by the required reduction in effective length of crank 11 9. Hence the camway 43 (see Fig. 7, Sheet 3) has a lower level in excess of ninety degrees and a higher level exceeding one hundred and eighty degrees connected by brief inclines, the points 47 and 48 in said camway representing the dead-points of pin 46 and of crank 13 18.

Gear 14 meshes with gear 15, fixed to shaft 16, which latter carries at its upper extremity spur-gear 17, which is in direct engagement with spur-gear 180, connected with the cam-cylinder 179. (See Fig. 1, Sheet 1, and Fig. 35, Sheet 7.)

It will be observed that a crank of fixed length and continuously rotating could replace crank 11 9 and a crank of variable effective length capable of rotation or reciprocation could replace crank 13 18, and the same result as above would be obtained. The difference would then be that the variable crank would be shorter in tubular than in pouch knitting, the reverse being the case in the construction above described, which for practical reasons is preferable. The reciprocating mechanism—i. e., cranks 11 9 and 13 18 and link 12—is then essentially a crank of fixed length, one of variable length, and a link connection, one of said cranks being revolved by the power-shaft and the other being connected with cam-cylinder.

The rotary driving mechanism comprises the reciprocating mechanism above noted, with also the train of gearing 34, 35, 36, and 37, and crank 38, cam 44, and crank 46 18, the latter members forming, essentially, a clutch mechanism for rotation only, which is engaged and disengaged during every revolution of crank-gear 14. In the form here shown the disengaging-cam is stationary and the connecting member (i. e., pin 42) between it and clutch member 41 revolves. As will be hereinafter shown, the cam may revolve and the said connecting member be capable of axial movement only. The rotating mechanism in its entirety may then be analyzed as either (a) a driving-crank, which constantly revolves, a link, and a driven crank, with a constantly-rotating clutch mechanism engaged with the driven crank at dead-points only to assist said crank over its dead-centers, or (b) a constantly-rotating clutch mechanism engaged through approximately two hundred and seventy degrees of the revolution of shaft 18, with a crank 13 18 fixed to said shaft and appropriate driving mechanism for said crank to enable it to move said shaft during the remaining ninety degrees of its revolutions. We are aware that in United States Patent No. 395,214, granted December 25, 1888, to which reference may be had, there is shown a mechanism for accomplishing the same purpose, which mechanism consists of a crank of variable length fixed to the driven shaft and forming with its connected parts the main driving mechanism for both rotation and reciprocation, which crank is provided with auxiliary friction mechanism for assisting it over the dead-points. The auxiliary mechanism is, however, in action throughout the entire revolution of the driven shaft in rotary knitting and is wholly out of action in pouch-knitting. We are also aware that in United States Patent No. 410,071, granted August 27, 1889, to which reference may be had, there is shown a rotary friction mechanism forming the main driver during (and in action throughout the full revolution of the driven shafts in) rotary knitting, with a crank of variable length fixed to the driven shaft, which crank when expanded forms the driving mechanism during pouch-knitting. In the former of these constructions the variable crank is the main driving member during both reciprocating and rotary movement and is assisted during the latter by an auxiliary frictional rotary train in action throughout the entire revolution of the driven shaft. In the latter construction the variable crank is the driving member during reciprocating movement, the rotary friction train drives during rotary movement, and the latter is in action during the full revolution of the driven shaft. In the construction herein described all frictional gearing is dispensed with and all connections are positive. The rotary mechanism is in action only during a portion of the revolution of the driven shaft in tubular knitting. The crank connections are the drivers during reciprocating knitting, and they combine with the rotary clutch mechanism to produce rotary movement.

Surrounding shaft 9 there is a bushing 49, made a drive fit in base-plate 5, and encircling this bushing there is a spur-gear 50, having a vertically-projecting lug 51, which is part of an annulus fitting groove 33 and capable of rotation in said groove, said lug being in the path of rotation of and therefore driven by lug 31 when the latter lug is in groove 33 while pouch-knitting is in progress. When tubular knitting begins, lug 31 withdraws to idle groove 34, leaving lug 51 and its attached gear 50 at rest. The function of this gear, as well as that of sprocket-wheel 52, pinned to shaft 9, will be explained hereinafter.

The mechanism for raising out of action or depressing into action the fashioning-needles, which latter are singly made active or inactive in pouch-knitting, is herein the same in function and design as that shown in United States Patent No. 472,029, granted April 5, 1892, to which reference may be had, excepting that the mechanism for reciprocating the indicating-cams therein designated as 39 and 40 and herein as 53 and 54, Figs. 10 and 11, Sheet 4, has been replaced by the following: As previously stated, spur-gear 50, Fig. 2, Sheet 3, revolves only during pouch-knitting. This gear, through an idle gear (not shown) engages cam-gear 55, Figs. 1ª, Sheet 2, and Figs. 12 and 13, Sheet 4, loosely mounted on a support 55ª, fixed in base-plate 5. On the upper surface of said gear there is formed a camway 56, which the pawl-bar 57 engages through the rotatable pin 58, journaled therein. The pawl-bar 57 (see Figs. 12 and 13, Sheet 4) carries pivotally joined to its upper surface the two oppositely-placed pawls 59 and 60, which engage, respectively, two ratchet-wheels 61 and 62, whose teeth are oppositely inclined to each other, said ratchet-wheels being fixed, respectively, to shafts 63 and 64. From the construction described it will be observed that as camway 56 revolves the shafts 63 and 64 will be moved in directions opposite each to each with step-by-step motion, and that one shaft moves while the other is at rest. One of these shafts is connected with each indicating-cam by mechanism to be described, and after the shortest course of the pouch is knitted the shaft which moves the lower indicating-cam in narrowing drives the upper cam in widening, and vice versa.

The mechanism for transmitting the motion of shaft 63 to either of cams 53 or 54 being similar in all respects to that for shaft 64, that of the former shaft only will be described, reference being had to Fig. 1ª, Sheet 2, and Figs. 10 to 14, Sheet 4. This shaft passes through table 65 and has feathered to it two similar clutches 66 and 67. It also is encircled by two loose clutch-gears 68 69, which are kept in position by three supporting-plates 70 71 72, said plates encircling and resting on a central standard 73, driven into table 65. Loose on said standard there is placed the spur-gear 74, which engages the upper loose gear 69 of shaft 63, its corresponding gear on shaft 64, and also the upper indicating-cam 53, which has spur-gear teeth on the portion of its circumference which in the reciprocation of it the gear 74 engages. Similarly there is placed on said standard the loose gear 75, which engages the lower clutch-gear 68 of shaft 63, its corresponding gear on shaft 64, and the lower indicating-cam 54, which has also spur-gear teeth on the portion of its circumference to be engaged. From the construction described it will be observed that the indicating-cams are driven by the loose gears on the standard, and that each of said loose gears (and its corresponding cam) is moved by that one of its engaged clutch-gears, as 69, which at that time is clutched to an indicating-shaft, as 63, the other engaged clutch-gear revolving idly on and being disengaged from the other shaft, as 64. Since the indicating-cams, with respect to each other, move always in different directions and at different times, it follows that if the lower cam is in engagement with shaft 63, as in Fig. 11, the upper cam must be in engagement with shaft 64, and vice versa.

In the lower side of cam-gear 55 there is cut a camway 76, which the pawl-bar 77 engages through the rotatable pin 78, journaled therein. Said pawl-bar carries pivotally joined to its under side the pawl 79, which engages the ratchet 80, fixed to the vertical cylinder-cam 81, which cam has a camway 82, formed with a high level of nearly one hundred and eighty degrees in extent and a low level of the same length, connected by brief inclines. The cam makes one revolution in pouch-knitting, and its camway 82 is engaged by cam-slides 83 84 through rotatable pins 83ª 84ª, journaled therein. Said cam-slides are set diametrically opposite each other and are guided in brackets 85 85, fixed to base-plate 5. Joined to cam-slide 83 is the shipper-bar 86, guided in bracket 87, secured to table 65. Said bar has pinned to it the clutch-forks 88 and 89, engaging, respectively, the upper clutch 66 and the lower clutch 67 of shaft 63. Cam-slide 84 actuates similar mechanism for the clutches of shaft 64. From the construction described it will be observed that when one shaft, as 63, is engaged with the lower indicating-cam, through the lower clutch 67, the lower clutch-gear 68, and the lower loose gear 75, the other shaft, as 64, is engaged, through its upper clutch and clutch-gear and the upper loose gear 74, with the upper indicating-cam, and vice versa; and also that, since cam-slides 83 84 are one hundred and eighty degrees apart and cam 81 makes one revolution during pouch-knitting, the engagement of shafts 63 and 64 with the indicating-cams will be changed, with respect to the particular cam and shaft engaged, at the middle and end of pouch-knitting.

The mechanism is essentially but two indicating-cams and two shafts, the shafts with respect to each other moving in opposite directions at different times and at such intervals as the disengagement of the knitting-cams with the needles will permit, there being combined with these and mechanism intermediate the shafts and indicating-cams, whereby each of the latter can at predetermined times be connected with the shaft, giving it the required motion in time and direction.

The jack-holder 90, Sheet 5, by which for pouch-knitting one-half, more or less, of the needles are raised *en masse* out of or depressed into action is the same in function and construction as that shown in United States Patent No. 472,029, dated April 9, 1892, to which reference may be had and therein designated as Nos. 26 and 27. It is guided in its vertical reciprocations by sockets 91 91, made integral with it, said sockets sliding on guiding-standards 92 92, fixed in the cylinder-plate. It is elevated and depressed through pins 91$^a$ 91$^a$, fixed in the said sockets 91 91, which engage the slotted lever-arms 93 93 of a double lever 93$^a$, pivoted and journaled at 94 94 in brackets 94$^a$, secured to table 65. The outer arm 93$^b$ of lever 93$^a$ has at a certain distance from its pivotal center an outturned socket 95, carrying a pin 96, capable of longitudinal movement in said socket, to which pin is pivotally joined a link 97, which link is also pivotally connected with a cam-slide 98 through a pin 99, fixed in the slide. The cam-slide is guided in a bracket 100, secured to base-plate 5, and has journaled in it a rotatable pin 101, by which said slide engages the camway 102 of a vertical cylinder-cam 103. Said camway has a high level of nearly one hundred and eighty degrees in extent and a low level of same length connected by brief inclines. From the construction described it will be observed that when cam 103 makes a semi-revolution the said cam-slide, link, lever, and jack-holder will be elevated or depressed, as the case may be.

Cam 103 (see Fig. 18, Sheet 5) is journaled on and supported by the bushing 104, driven firmly in base-plate 5. Said bushing also encircles and journals the shaft 105, which is continuously rotated by spur-gear 106 fixed to it and engaging the spur-gear 35, Fig. 2$^a$, Sheet 3. To the upper extremity of shaft 105 is pinned the hub 107, (see plan Fig. 21, Sheet 5,) carrying the annular and depending lugs 108 108, the driving faces of which are radial. On the upper surface of cam 103 is formed the partly-annular boss 109, Fig. 19, Sheet 5, in which boss is cut the slot 110, which forms a guideway for the block 111, Fig. 20, Sheet 5, having an upwardly-extending lug 112, with a driving-face which, when in position in the cam, is radial. The block 111 has also journaled in it a rotatable pin 113, extending upward to engage a circular path 114, Fig. 22, Sheet 5, turned in the lower face of an eccentric slide 115, which slide is supported and guided in brackets 116 117, secured to base-plate 5. From the construction described it will be observed that when eccentric slide 115 is so moved on a line passing through its center and the center of shaft 105 as that the path 114 is not concentric with annular lugs 108 108 the said path will, through pin 113, draw lug 112 into the path of rotation of the continuously-rotating lugs 108 108; also, that the first of these lugs to meet said lug 112 will first engage and then pass from engagement with lug 112 and during said engagement will, through lug 112, block 111, and the sides of guideway 110, move the cam 103 through an arc, the angular extent of which will depend upon the radial lengths of the driving-faces of lugs 108 and 112 and the amount of eccentricity of path 114 with regard to the center of lugs 108 108. In this construction the proportions are such that the said arc of movement shall be one hundred and eighty degrees. Since it is desirable that the elevating and depressing strokes of the jack-holder shall each occur at about the same position of the cam-cylinder in its movement, there are two lugs 108 108, and these lugs are made one hundred and eighty degrees apart on hub 107. As a precautionary measure, a friction-brake of ordinary type may be fitted to the upper face or cylindrical surface of cam 103 if the load-friction of said cam be not sufficient to overcome its momentum and bring it to rest after either of lugs 108 108 is disengaged from lug 112. In one end of slide 115 there is fixed a pin 118, through which said slide is reciprocated at predetermined times by devices under control of a pattern-chain, as will be hereinafter described.

When the machine herein described is used for making half-hose with ribbed tops or in footing ribbed or other hose, it is desirable to stop automatically said machine after the completion of the toe in order that a ribbed top or leg may be placed upon the needles of the machine after the hose just formed has been removed or that a new cylinder having said top or leg upon its needles may be set in the machine in place of the one just in use.

The belt-shifters 137 137, Fig. 1, Sheet 1, and Fig. 15, Sheet 5, are bolted to the shifter-rod 134, which rod is guided in brackets 135, secured to base-plate 5, and in rectangular bearing 136 in bracket 6, Fig. 1, Sheet 1, and Fig. 2, Sheet 3. The shifter-arms are normally pressed to the right, bringing the belt above loose pulley 1, by the spring 138 acting between bracket 135 and hub of shifter-arm 137. In the inner end of shifter-rod 134 is fixed a pin 133, which engages the slotted end of a crank 132, fixed to a shaft 131, said shaft being journaled in base-plate 5 and table 65. To the upper end of said shaft 131 and above table 65 is fixed the crank-handle 128$^a$, to which crank-handle we apply latching devices such as we now will proceed to describe. To the said crank-handle is pivotally joined the bell-crank 127 127ᵃ by pin 128, fixed in said handle. To the arm 127ᵃ of the said bell-crank is pivotally joined the link 129 by pin 129ᵃ, passing through both the link and arm. The link 129 rests on table 65 and is pivotally united thereto by pin 130 set in said table. There is further set in said table a stop-pin 139 in such position that the link 129 and arm 127ᵃ shall rest against said stop-pin when said link and arm are by crank-handle 128ᵃ extended in a right line.

The construction thus far described is that simply of an ordinary starting and locking device, the arm 127ᵃ and link 129 with their various pivotal joints forming a "knuckle-joint" of ordinary type, by which and the pressure of spring 138 the crank-handle 128ᵃ, when moved to the right until said link and arm are in a right line, will be locked or latched in that position with the belt-shifters 137 over the fast pulley 2 and the machine therefore in operation. The stop-pin 139 is, by preference, so placed that the link and arm referred to shall, when resting against it, be not exactly in a right line but inclining toward the front by a very small amount. This, however, is a precautionary measure, the main purpose of said pin being to prevent said link and arm, when tripped, from moving in any other direction than that toward the back or rear, as shown by arrow, Fig. 15.

We employ unlatching or tripping devices such as we will now describe. The outer arm 127 of the bell-crank extends to the front in the path, when locked, of the inturned end 126 of a reciprocating slide 125, said slide being guided by brackets secured to table 65. In the left-hand end of said slide is fixed a pin 124ᵃ, which engages the slotted end of a crank-arm 124, made integral with a hub 122, capable of oscillation on a pivot 122ᵃ, fixed in table 65. Made integral with said hub 122 there are also a crank-handle 123 and a segmental ratchet-arm 121.

From the construction described it will be observed that when ratchet-arm 121 moves to the front the slide 125 and its inturned end 126 reciprocate to the left, the end 126 then tripping the arm 127 of bell-crank 127 127ᵃ, forcing the inner arm of said bell-crank and link 129 over their dead-point and enabling spring 138 to move the pvotal joint 129ᵃ to the rear, the crank 128ᵃ to the left, and the shifter-rod 134 to the right, bringing the shifter-arms 137 over the loose pulley and stopping the machine.

In the left-hand end of the pivotal shaft 93ᵃ there is fixed a crank-pin 119, which pin engages a slot in the reciprocating bar 120, which bar has pivotally joined to its outer end a pawl 120ᵃ, pressed by a spring (not shown) against the ratchet-arm 121. The pawl 120ᵃ has a bell-crank arm 120ᵇ to enable it to be readily moved by hand from engagement with the ratchet-arm 121. The crank-pin 119 is placed below the center of the pivotal shaft 93ᵃ, and therefore when crank-arms 93 93 and jack-holder 90 move downward after the completion of a heel or toe the pawl 120ᵃ will move ratchet-arm 121 to the front by the angular amount of one ratchet-tooth. At the beginning of the heel and again at the beginning of the toe the pawl 120ᵃ is retracted. At the end of the heel and again at the end of the toe it is advanced, pushing the ratchet-arm 121 to the front. It is evident, then, that the inturned end 126, during the making of the foot, is moved twice to the left. But two teeth are therefore required in the ratchet-arm 121, and if, in beginning a stocking, the pawl 120ᵃ is placed in one of said two teeth which is nearer the front, and if the length of slide 125 is properly proportioned, the inturned end 126 will, when the jack-holder is depressed at the completion of the toe, move to the left, trip the knuckle-joint 129ᵃ, and permit the spring 138 to force the belt onto the loose pulley and stop the machine.

In starting the machine the pawl 120ᵃ is first disengaged from ratchet-arm 121 by pressing against the arm 120ᵇ, when the handle 123 is moved to the left until said pawl engages the first of the two ratchet-teeth above referred to. Then the crank-handle 128ᵃ is moved to the right until the knuckle-joint 129ᵃ bears against the stop-pin 139. This brings the belt on the fast pulley 2 and the machine is started.

It has been found convenient for the operator to be able to move the jack-holder and its attached needles and jacks by hand when the machine is at rest. To effect the detachment of the jack-holder lever 93ᵃ from its reciprocating mechanism, two collars 96ᵃ and 96ᵇ are turned on the pin 96 and two vertical forks 125ᵃ 125ᵃ are formed on slide 125, which forks engage pin 96 between said collars 96ᵃ 96ᵇ. The pin 96 is made to extend beyond the hub 97 when in position. When slide 125 makes its final movement to the left, tripping knuckle-joint 129ᵃ, the forks 125ᵃ withdraw pin 96 from engagement with link 97, permitting lever 93ᵃ and its attached jack-holder to be manipulated at will through handle 93ᶜ. Since the slide 125 cannot be moved to the right without advancing pin 96 into engagement with link 97, and since the machine cannot be started without said slide being moved to the right, it follows that there is no possibility of the operator beginning the knitting with the jack-holder disconnected from its actuating mechanism.

In the present machine two pattern-chains are employed. Of these the primary chain is used for throwing into and out of operation the reciprocating driving mechanism, the jack-holder mechanism, and the yarn-splicing and take-up mechanisms, while the secondary chain is employed solely for indicating the operation of the mechanism for shaping the leg of a long hose. The primary chain and its connections are fully shown on Sheet 6, they being represented in Fig. 1, Sheet 1, also. Cam 140, which drives said primary chain, is fixed to the continuously-revolving shaft 36, Fig. 23, Sheet 6, Fig. 2ª, Sheet 3. Said cam in revolving reciprocates lever 141, pivoted at 142 on the base-plate, and said lever engages cam-path 143 of cam 140 by friction-roller 144, journaled in the lever. The other end of said lever is forked and engages a pin 145, fixed in pawl-bar 146, which bar reciprocates in guideways formed in the framing. The bar 146 carries pivotally joined to it two pawls 147 and 148. The outer pawl 147 actuates the ratchet-wheel 149, bolted to sprocket-wheel 150, which carries primary pattern-chain 151. Said chain is composed, as shown, of plain links, as 152, and links formed with horizontally-projecting spikes 153, which spikes, as the chain travels, project inward and between pawl 148 and second ratchet-wheel 154, bolted to spur-gear 155.

Pawls 147 and 148 are similar in form and travel, and ratchet-wheels 149 and 154 are also similar to each other. Said ratchet-wheels with their attached mechanism revolve on the spindle 156, fixed in the framing. Sprocket-wheel 150 has an inner cylindrical extension 157, and pawl-bar 146 has a central downward extension 158, which extension gives spikes 153 a firmer horizontal support. In Figs. 31 and 31ª the pawl 148 is shown retracted. In Fig. 31 there is a spike 153ª beneath its point holding it out of engagement with ratchet-wheel 154, and since pawls 147 and 148 move in unison it is evident that spike 153ª will advance with pawl 148 and hold it out of engagement with ratchet-wheel 154 during the forward motion. Between spiked links 153ª and 153ᵇ there is a plain link, the center of whose location is marked as 152ª, and, as shown in Fig. 31ª, where pawl 148 is again retracted, the pawl 148, having there no support, will fall and engage the ratchet-wheel 154, moving said ratchet-wheel forward in its next advancing stroke. On the succeeding retraction the pawl is again tripped by spike 153ᵇ, and as said spike is advanced by ratchet-wheel 149 it holds said pawl out of engagement.

From the construction described it will be observed that while pawls 147 and 148 are continuously reciprocated and pawl 147 is always in engagement pawl 148 is engaged only where a plain link of chain 151 is beneath its point. Essentially the mechanism consists of a traveling shield between a pawl and its ratchet-wheel, said shield having apertures which at predetermined times permit said pawl to engage its ratchet-wheel, said shield and pawl moving together.

Since it is advisable to reduce the length of chain 151 as much as is possible, a masked ratchet-wheel 159 is used as a partial shield for ratchet-wheel 149, being mounted, Fig. 33, loosely on spindle 156 and just outside of ratchet-wheel 149. Masked ratchet-wheel 159 is of the ordinary type, excepting that there must be two full teeth 159ª in succession, the first to bring a plain link beneath pawl 148 and allow said pawl to engage and the second to move ratchet-wheel 149 in unison with ratchet-wheel 154 in order that a spiked link may be brought beneath and trip said pawl, since, as will be hereinafter explained, two movements by successive strokes of bar 146 are not desired for the parts connected with ratchet-wheel 154. Masked ratchet-wheel 159 is held against accidental movement or retraction by brake-spring 160 bearing on its surface and bolted, as shown, to spindle 156 and outside cap 161 of said spindle. The sprocket-wheel 150 has also in practice a brake-spring (not shown) of ordinary type to prevent undue movement. When the masked ratchet-wheel is employed, pawl 147 has an outward extension 147ª, Fig. 34, to enable it to engage said ratchet-wheel.

Spur-gear 155 engages spur-gear 162, fixed to shaft 163, which shaft is suitably supported in brackets secured to the base-plate. At its inner end there is pinned to said shaft the miter-gear 164, engaging miter-gear 165, fixed to vertical shaft 166, which for convenience may be designated the "change-shaft." By preference ratchet-wheel 154 has twelve teeth and the ratio of gears 155 and 162 is as six to one. Therefore a single movement of ratchet-wheel 154 will give shaft 166 a semi-revolution. To said shaft 166 is fixed the eccentric 167, which through the eccentric strap and rod 168, pivotally joined to pin 29 of crank 28, reciprocates said crank and through it the attached switch 26, thus effecting, as previously described, the change from rotary to reciprocating movement of the cam-cylinder, and vice versa. There is also fixed to shaft 166 the eccentric 169, which acting between pin 170, fixed in link 171, and pin 172, passing through said link and fixed in eccentric-slide 173, reciprocates said link and through it the attached eccentric-slide 115, which is joined to said link by pin 118, fixed in said slide and passing through said link. Slide 115, as previously described, when reciprocated puts in operation the jack-holder mechanism. The link 171 also reciprocates the eccentric-slide 173 through the pin 172, and said slide, as will be hereinafter explained, puts in motion the yarn-splicing and take-up mechanisms. It will be understood that one movement of ratchet-wheel 154, as at the beginning of the heel or toe pouch, will give a reciprocating stroke to crank 28 and eccentric-slides 115 and 173, and the next movement of said ratchet-wheel just prior to the end of the heel-pouch or toe-pouch will complete the reciprocation of said crank and eccentric slides.

In pawl-bar 146 is fixed the pin 174, on which is journaled the slide-block 175, from which, as will be hereinafter explained, motion is obtained for driving the secondary or shaping pattern-chain.

In making long hose on a circular machine it is usual to knit the upper part of the leg with the longest stitch; to decrease gradually the length of the stitch from the calf to that part of the ankle where the tube is narrowest and stitch is shortest; then to widen gradually the web by lengthening gradually the stitches for, finally, about one-third the amount they have been shortened in the distance between the narrowest point of the ankle and the beginning of the heel; to knit the heel throughout with the stitch of greatest length; to knit the foot with the stitch of smallest length, and to knit the toe with the stitch of greatest length. The variation in the stitch is effected by changing the height of that one of the stitch-cams—as cam 176, Fig. 38, Sheet 7—which draws the needle down to its lowest limit in tubular knitting. Since the other stitch-cam 176ª depresses the needle only in pouch-knitting, it may be adjusted to knit only the longest stitch, as above described; but cam 176 being operative in the leg, foot, and both pouches must be capable of knitting either a long stitch or a short stitch with a limited number of variations between.

Fig. 38 shows in development a short portion of cam-cylinder to which this invention is applicable; but it will be understood that we do not limit ourselves to this form only, since the invention may be used in changing the limit of any drawing-down cam. The said cam-cylinder 179 has, as shown, an upper cam 177, a side or stitch cam 176ª, and a lower or rest cam 178, all bolted to its inner surface and all of ordinary form and relative position. The left-hand stitch-cam 176 is movable, the full lines showing its lower position and the dotted lines its higher position. For clearness the distance between the two positions has been exaggerated.

In the present invention the arrangement of the needle-cylinder and its adjacent mechanism is similar in all respects to that shown in United States Patent No. 472,029, dated April 5, 1892, to which reference may be had. The cam-cylinder 179 rotates or reciprocates about said needle-cylinder in the ordinary manner, being driven, Fig. 35, by spur-gear 17, fixed to shaft 16, Fig. 1, said shaft being journaled in box 179ª, bolted to the table. Gear 17 meshes with spur-gear 180, formed on the circumference of the flange of the cam-cylinder, the latter being bolted to a supporting-flange 181 by bolts 182, said flange moving with said cylinder and resting on the cap 183, which is bolted to cylinder-plate 184 by bolts. (Not shown.) The cylinder-plate, as in the patent above referred to, supports the needle-cylinder and a portion of the fashioning mechanism, (not shown,) including the indicating-cams 53 and 54. It is secured to the table by bolts 186. Plates 186ª, Fig. 36, secured to cap 183 and overlapping the edge of flange 181, keep said flange from vertical movement. Stitch-cam 176 is bolted to a filling-block 187, Fig. 39, which block passes through an orifice in the cam-cylinder and is in turn bolted rigidly to a partly-cylindrical guide-rod 188, flattened on one side to make joint with said filling-block. Rod 188 moves in a circular guideway 189, partially cut away on the inner side, as shown, formed in guide-block 190, which last is bolted to the cam-cylinder by bolts 191. The guide-rod, filling-block, and cam are sustained and pressed upward by coiled spring 192, acting between the flange of the cam-cylinder and a flange 193, formed on the guide-rod by reducing the diameter of its lower portion. The upper extremity of the guide-rod is reduced to a point, which point bears on camway 194 of cam-disk 195, which camway is formed as an annular band on the outer part of the lower face of the cam-disk and varies only in a vertical direction. The cam-disk is loose on a vertical shaft 196 and is sustained by coiled spring 197, acting between collar 198, formed on said shaft and the bottom of said disk, and is pressed downward by a key 199, having a flat lower side and tapered upper side and fitting in a keyway (whose upper side is similarly tapered) cut in shaft 196. Said key passes, also, through a radial groove cut in a pin 200, fixed in the disk. By this means the disk is driven in unison with shaft 196, while the vertical height of the disk can be regulated by moving in or out the key 199 in its keyway.

In Fig. 40 is shown a development of the circumference of cam-disk 195, from which it will be seen that said disk has high and low points in its camway. From the construction described it will be observed that by rotating shaft 196 cam 176 will be depressed to make a long stitch, or spring 192 will be permitted to elevate it for a short stitch. The said disk, as shown in development and as described hereinafter, is so formed as that its complete revolution shall effect all of the changes necessary in the height of cam 176 during the knitting of an entire long hose. Shaft 196 passes through the flange of the cam-cylinder, Figs. 36 and 39, and to its lower end is fixed spur-gear 202, the latter engaging spur-gear 203, which is loose on pin 204, fixed in flange 181. Said gear 203 meshes with gear 205, loose on pin 206ª, fixed in flange 181. To the upper extremity of pins 204 and 206ª are bolted caps 207 and 208, respectively, which hold the gears on said pins from vertical movement. By preference the gears 202 and 205 are equal, and the ratio between them and gear 203 is as one to four. To gear 205 is bolted ratchet-wheel 206, which is held from undue backward or forward motion by a detent or brake-spring of ordinary type and for clearness omitted. From the construction described it will be observed that when ratchet-wheel 206 is moved forward the space of one tooth disk 195 will be advanced the same angular amount. Ratchet-wheel 206 is continuously engaged by pawl 208, which is pivotally joined at 208ª to pawl-bar 209, which bar is pressed outward and retractively by spring 210, secured to flange 181 and pressing on pin 208ª. The said bar is guided in boxes 211, secured to said flange, the outer of which boxes by contact with pawl 208 fixes the outer limit of stroke of the bar. The outer extremity of the bar is formed as the arrow-cam 212, which cam is capable always of engagement with and advancement by the pin 213 when said pin is elevated and operative. Pin 213 is guided in circular orifices in cap 183 and in plate 214, secured to said cap, and is pressed upward by coiled spring 215, acting between said cap and a collar 216, formed on said pin. The latter, Figs. 44 and 45, has two positions—namely, an upper and active one when it is in the path of cam 212 and a depressed inactive position when it is withdrawn from said path and held depressed by lever-catch 217, shaped as a bell-crank and pivoted at 217$^b$ on cap 183. Bell-crank 217 is pressed toward pin 213 by spring 218, secured to cap 183 and acting against outer arm 217ª of the bell-crank. The said bell-crank holds pin 213 depressed by intervening between collar 216 and plate 214. Engaging said outer arm 217ª is the tripping-crank 218ª, fixed to rock-shaft 219, said rock-shaft being journaled in box 220, bolted to the table. On the outer end of shaft 219 is fixed the double crank 221, carrying journaled in its extremities the rotatable pin 222, which bears on pattern-chain 223, and is held in engagement therewith by spring 223$^c$, fixed to box 220 and pressing on crank 218ª. The secondary or shaping chain 223 is composed, as shown, of chain-links, as 223ª, and inclined links, as 223$^b$, the latter being equal in number to the teeth on ratchet-wheel 206.

From the construction described it will be observed that when an inclined link 223$^b$ passes beneath pin 222 the latter and its crank will be raised, carrying with it shaft 219 and rocking the crank 218ª to the right, which crank will then move arm 217ª to the right and withdraw the other arm of bell-crank 217 out from engagement with pin 213, permitting spring 215 to elevate said pin to active position, and that when in the revolution of the supporting-flange cam 212 strikes said pin ratchet-wheel 206 will be advanced the space of one tooth. Pin 213 is allowed to rise only when the cam-cylinder and supporting-flange are moving in the direction of the arrow, Fig. 36. Since one link on chain 223 represents a comparatively-large number of knitted courses and of revolutions of said flange, and since but one movement of ratchet-wheel 206 is desired for each inclined link, and since cam 212 is always operative, it is evident that pin 213 must be depressed and inactive before cam 212 reaches it in the subsequent revolution, after advancement, of said cam. To effect this, there is bolted to the supporting-flange and in rear of cam 212 the bracket 224, in which is secured rigidly the bar 225, carrying the depressing-cam 226, Fig. 46, which cam, when pin 213 is raised, will in its revolution strike said pin and depress it until lever-catch 217 can again enter between collar 216 and plate 214 and thus hold pin 213 depressed and inactive. The secondary chain 223 rests on and is rotated by the sprocket-wheel 227, loose on spindle 228, fixed in framing. To said sprocket-wheel is bolted the ratchet-wheel 229, driven by pawl 230, pivotally joined at 231 to bell-crank 232, pivoted on spindle 228, and kept thereon by cap 228ª, Fig. 48, bolted to said spindle. The lower arm 232ª of said crank carries a pin 233, on which is pivoted the slide-block 234, which block is embraced by the upper forked end 235ª of a lever 235, pivoted on a spindle 236, fixed in the framing and kept on said spindle by a cap 237, bolted to the latter. The lower end 235$^b$ of said lever is also forked and embraces a similar slide-block 175, pivoted on pin 174, fixed in the pawl-bar 146, already described in treating of the actuation of the primary chain. The continuous reciprocation of bar 146 has been previously described, and through it chain 223 is driven. In order to shorten said chain, a masked ratchet-wheel 238 of ordinary type may be employed having full teeth 238ª and masked teeth 238$^b$, which ratchet-wheel is loose on spindle 228 and between ratchet-wheel 229 and pawl-crank 232. The pawl 230 is also made of sufficient width to engage both ratchet-wheels 229 and 238. Ratchet-wheel 238 is fitted with a brake-spring and ratchet 229 is fitted with a detent and brake-spring. These attachments are to prevent undue motion, but being of ordinary type are for clearness omitted.

Respecting the mechanism which has just been described it will be observed that there is the widest range as to the time at and during which the stitch-cam 176 is elevated or depressed. This can be effected at and during any period by the proper regulation of the following—viz: the speed and form of pattern-chain camway 143, the number and relative position of the inclined links 223$^b$ of pattern-chain 223, the number of full teeth 238ª in masked ratchet-wheel 238, the number of teeth in ratchet-wheel 206, the relation of the gears 205, 203, and 202, and, finally, the form of depressing-camway 194. For convenience only we form the latter, as shown in Fig. 40, in which the space $v\,w$ is the part of the cam that is above rod 188 during leg-knitting, $w\,x$ during heel-knitting, $x\,y$ during foot-knitting, and $y\,z$ during toe-knitting. As shown, the section $v\,w$ has a low level 195ª 195$^b$, while the upper portion of the leg is knitting with a long stitch, and then a gradual incline upward 195$^b$ 195$^c$, while shaping is in progress at the ankle portion with a gradually-reducing stitch. The section $w\,x$ has a rapid incline downward 195$^c$ 195$^d$ from the shortest to the longest stitch, and then a level portion 195$^d$ 195$^e$ during heel-knitting and giving the longest stitch therein. The section $x\,y$ has a rapid incline upward 195$^e$ 195$^f$ from the longest to the shortest stitch, and then a level portion of high level 195$^f$ 195$^g$ during foot-knitting and giving the shortest stitch therein. The section $yz$ has first a rapid incline downward $195^g$ $195^h$ and then a level portion of low level $195^h$ $195^k$, giving the longest stitch during the toe-knitting. We do not, however, limit ourselves to any specific form of camway or any specific combination of the parts hereinbefore enumerated.

In regard to the shaping mechanism it will be observed, that cam 176, filling-block 187, and guide-rod 188 compose in their entirety but a guided stitch-cam with suitable projections for receiving elevation and depression. Therefore these parts can be varied in number and form, providing they satisfy the above conditions; that cam-disk 195 can be revolved by any suitable mechanism, and without automatic attachments would form a convenient mechanism for readily adjusting by hand the vertical height of cam 176 or of cam $176^a$, if applied also thereto; that key 199 provides a means of neutralizing vertical lost motion up to the point of application of depressing force to the guide-rod 188, and also gives convenient means of adjusting the vertical range of movement of cam 176.

As in United States Patent No. 472,029 before referred to, the position and operation of the yarn-splicing and take-up mechanisms are in the present invention controlled by a shaft similar to the shaft designated as No. 157, Figs. 30 and 31, Sheet 6, of Patent No. 472,029, which shaft is herein marked 201, Sheet 8, Fig. 49. Said shaft has fixed to it cams for actuating the mechanisms above specified and is caused to move through a semirevolution just previous to pouch-knitting and to complete that revolution just prior to the end of pouch-knitting. (See Sheet 8.) The motion of the shaft 201 is indicated by that of the eccentric-slide 173, whose reciprocation has been previously described. Engaging the circular path $173^a$ of said slide is the pin 255, rotatably journaled in the radial slide 256, Fig. 55, Sheet 8, which latter slide is by slide 173 reciprocated in a radial guideway 257, Fig. 53, Sheet 8, formed in the disk 258, fixed to shaft 201. To the under surface of said disk is secured the plate 259, which holds slide 256 in position, and formed on the under side of slide 256 is the lug 260, which is capable of engagement with and rotation by either of lugs 261, formed on the upper side of disk 262, fixed to shaft 263, which shaft is continuously revolved by a sprocket-chain (not shown) engaging sprocket-wheel 264, pinned to said shaft, and sprocket-wheel 52, fixed to shaft 9, Sheet 1, Fig. 1. The stroke of eccentric-slide 173 is such that in either of its two positions of rest its circular path $173^a$ is not concentric with shaft 201; but the center of description of said path is, previous to the formation of a pouch, on one side as the rear, Fig. 49, of the center of shaft 201, and just previous to the completion of said pouch is moved to the other, as the front, side of the center of said shaft. The amount of this eccentricity and the radial width of lugs 260 and 261 are so proportioned as that when lug 260 enters the paths of lugs 261 it will engage and be driven by the first of the latter lugs to meet it, through an angular distance of one hundred and eighty degrees, and will then, owing to said eccentricity, complete the disengagement from lug 261, which has been gradually occurring since the mid-point of their united travel, and come to rest. Since the motion of the mechanism prior to both the beginning and end of pouch-knitting should begin at the same point of the advancing movement of the cam-cylinder, there are two lugs 261, one hundred and eighty degrees apart, formed on disk 262, one of which lugs engages lug 260 at the beginning and the other at the end of pouch-knitting. The mechanism thus far described resembles that shown in the patent above referred to in the radial disengagement of the driving and driven lugs only, which disengagement, as shown in Figs. 30, 31, and 34 of said patent is therein effected through a reciprocating cam-slide having cam-blocks formed thereon, which blocks press inward and disengage a spring-pressed lug, designated therein as No. 163, and corresponding with lug 260 of the present invention. The mechanism herein shown is a better mechanical construction, in that it is more positive.

To a standard $264^a$, fixed to the table, is secured the bracket 265 by set-screw 266. Said bracket has an orifice 267, in which shaft 201 is journaled, and a socket 268, in which is secured by set-screw 270 the standard 269. To the top of standard 269 is pinned the bracket 271, in a rear extension of which the shaft 201 is journaled, and on a forward extension $271^a$ of which is bolted the yarn-frame 272. Screwed into said frame 272 are the leading-eyes 273 for the main yarn 293 and the reinforcing-yarn 292, and secured to sleeves 274 are the take-up springs 275 and 276 for the main and reinforcing yarns, respectively. On a circular rod 277, secured in bearing 278, which extends upward from frame 272, there are placed two sets of spring-pressed tension-plates—one set, 279, for the main yarn and the other set, 280, for the reinforcing-yarn. The tension-plates are of ordinary type, and the two sets are similar in all respects. That for the main yarn consists of two metallic disks $279^a$ $279^b$, loosely mounted on rod 277, and between which said yarn passes, the plates compressing it with a force dependent upon that of spring $279^c$, acting on plate $279^a$ and between bearing 278 and said plate. Plate $279^a$ in turn presses against plate $279^b$, which rests against the nut $279^d$, threaded on rod 277. From the construction described it will be observed that when spring $279^c$ is permitted to press the plates together there will be frictional tension on the yarn, but that when said plates are forced apart the yarn will flow freely through the eyes 273, between plates $279^a$ $279^b$, over the hooked end 275ª of take-up spring 275, through the eye 281, formed in frame 272, and thence to the cam-cylinder. Similarly the reinforcing-yarn 292 passes between plates 280 with or without frictional tension, according as said plates are pressed together or apart, thence over the hooked end 276ª of the take-up spring 276, through the eye 282, formed in the yarn-frame, and to the cam-cylinder. The take-up springs are made of steel wire and are of the ordinary type in all respects.

In knitting tubular work it is usually desirable to avoid tension on the yarn. In knitting pouches the take-up springs should be in action to draw the slack yarn when the knitting-cams, having reciprocated beyond the needles which are in action, begin their return to said needles. In order that said take-up springs may draw said yarn backward from the needles instead of forward from the yarn-supply, the tension-plates 279 and 280 are interposed between said springs and the yarn-supply, so that they may present a resistance to the draft of yarn from that source. This arrangement is that ordinarily followed and is well known.

In the patent before referred to we have shown a device for removing in tubular knitting the strain of the take-up springs from the yarn, consisting of a wire rod, therein designated as 191, (Patent No. 472,029, Figs. 35 and 36, Sheet 6,) which rod is so actuated, as in tubular knitting, to press said springs downward and relieve their strain upon the yarn. In the present invention we embody an improvement upon this device, by which in tubular knitting the springs are not only forced downward, as before, but are also pressed between the plates composing their respective tension devices 279 and 280, thereby opening out plates 279, and thus removing tension on the main yarn in tubular knitting and opening also plates 280, so that when the reinforcing-yarn is to be inserted at the beginning of pouch-knitting there may be no resistance to its flow.

The controlling mechanism for the main take-up spring 275 consists of a curved plate 283, in which is cut a guideway 283ª for said spring, said plate being bolted to the curved surface of a segmental crank 284, which crank is fixed to a rock-shaft 285, journaled in bearings 286, formed on the rear end of the frame 272. To shaft 285 is fixed, also, crank 287, which carries the rotatable pin 288, the crank being pressed by a spring, (not shown,) so that said pin may bear on and follow the contour of a cylindrical cam 289, fixed to shaft 201. Said cam has, as shown, brief high and low levels one hundred and eighty degrees apart and connected by inclines. From the construction described it will be observed that when shaft 201 moves through a semi-revolution just before the end of pouch-knitting plate 283 will be depressed, (as shown by full lines in Fig. 49, for the similar plate 290, to be hereinafter described,) and that when said shaft completes its revolution just previous to pouch-knitting plate 283 will be elevated, as shown by dotted lines in said figure. It will also be observed that the length of guideway 283ª is so proportioned as that when plate 283 is depressed in tubular knitting spring 275 is forced between tension-plates 279 and all resistance to the flow of the main yarn is removed, and that when said plate 283 is elevated spring 275 escapes from plates 279 and is permitted to reciprocate in pouch-knitting. To the take-up spring 276 for the reinforcing-yarn 292 is applied a similar curved plate 290 with a similar guideway 290ª, said plate being secured to a similar segmental crank 291, which crank is, however, loose on shaft 285, and the hub of which, as shown in Fig. 51, has a segmental portion cut away from a part of its length, leaving the orifice 291ª therein. In shaft 285 is fixed the key 285ª and in hub of crank 291 is secured the wire rod 291ᵇ, carrying the counterbalance 291ᶜ. From the construction described it will be seen that as shaft 285 rocks forward and plate 283 descends plate 290 will not be depressed until key 285ª strikes the forward side of the orifice 291ª, and that when shaft 285 rocks rearward and plate 283 ascends plate 290 will not rise until said key meets the rearward side of said orifice. A brake-spring (not shown) is fitted to the hub of crank 291 to prevent undue motion. This independent movement is given plate 290 mainly in order that after shaft 285 begins to rock rearward previous to pouch-knitting said plate may remain down with spring 276 and keep tension-plates 280 open as long as is possible, that the reinforcing-yarn 292 may have nothing to prevent its free flow in insertion. It is also advantageous when at the completion of pouch-knitting said yarn is cut out, since previous to the cutting a loop of slack yarn is drawn from the supply of reinforcing-yarn over spring 276, as will be hereinafter described. It is evident that if this spring be retracted when said loop is drawn it will when depressed increase the amount of slack yarn. It will be observed that by decreasing the speed of shaft 201 and fixing thereto an independent cam for the operation of plate 290 the above-described method of operating said plate from the mechanism for plate 283 may be dispensed with.

As shown in Figs. 63, 64, 64ª, 65, and 65ª, it is possible, through the direction and length of the guideway 283ª, to control accurately the amount of tension on the main yarn in tubular knitting due to the take-up spring and tension-plates. In Fig. 63 is shown the guideway 283ª, whose action is above described in detail, and which, as shown for a similar take-up spring 276 in Fig. 49, forces the take-up spring 275 fully down and between the tension-plates. If this guideway extend farther, as in 283ᵇ, Fig. 64, the spring will not be depressed fully and will not force the plates apart, as shown in Fig. 64ª, giving a full tension from said plates and a partial tension from said spring. If the guideway be inclined outward, as shown at 283°, Fig. 65, but extend to the same vertical height as in 283ª, the spring will be fully depressed, but will not enter between plates 279, as shown in Fig. 65ª, giving a full tension from the plates and no tension whatever from the spring. It will be observed that the tension-plates can be opened by any projection properly proportioned and set on the curved plates 283 and 290. The use of the take-up springs for this purpose is merely incidental and for economy of construction only.

The parting-bar for separating the reinforcing from the main yarn, when it is desired to remove the former at the end of pouch-knitting, is identical with that described in the patent before referred to, (No. 472,029, Sheet 6, Fig. 39.) It consists of a single section 294, serving as a shield between the main and reinforcing yarns, to which is pivoted at 294ª a section 294ᵇ, forked at its outer end to embrace and lead away the reinforcing from the main yarn. The inner end of section 294ᵇ is pressed by a spring (not shown) against a cam 295, fixed to bracket 297, which cam is in function similar to the cam designated as 205 in patent before referred to, but in form is a plain incline, thus: ∧. Section 294 is pinned to rock-shaft 296, journaled in bracket 297, fixed to standard 269. To the end of said rock-shaft is pinned the crank 298, carrying the rotatable pin 299, the crank and pin being pressed by a spring, (not shown,) so that they bear on and follow the contour of a cylindrical cam 300, which cam has a lower level of about one hundred and eighty degrees in extent, a gradual incline from this, a brief upper level, and a perpendicular descent to the first and lower level. The cam is so proportioned and set as that on the first semi-revolution of shaft 201, prior to pouch-knitting and when the reinforcing-yarn is being inserted, the pin 299 shall rest on the lower level of cam 300 and no parting of parting-bar shall ensue, and that when said shaft completes its revolution and said reinforcing-yarn is to be cut out said pin shall ascend the incline of cam 300 and the parting-bar shall be gradually depressed, while during said depression the forked section 294ᵇ of said bar is forced by cam 295 outward from section 294, carrying with it said yarn 292, until in its descent section 294ᵇ meets and clamps said yarn on a pad 301ª of yielding material, as rubber, which is fixed on the inserting-wheel 301. The forked section retains this position for a brief period, while, as hereinafter described, the yarn 292 is cut and is then, by the quick descent of pin 299 from the high to the low level of cam 300, rapidly elevated, cam 295 permitting it as thus raised to move inward toward section 294. In the descent of the parting-bar the section 294 acts as a shield between the main and reinforcing yarns, preventing the former from being drawn from its central position by the latter. At the lower limit of said descent, as shown in Fig. 62, said section aids in laying the reinforcing-yarn within the clamp 323 324, as will be hereinafter explained.

Just before the cutting out of the reinforcing-yarn there is, as previously stated, a loop of said yarn drawn out through the take-up spring 276 and tension-plates 280, in order that when said yarn is again to be inserted it may be entirely slack and with no resistance to its flow. The operation of drawing said loop is synchronous with the descent of the parting-bar, and the mechanism for effecting it consists of a lever 302, pivoted at 303 on the bracket 304, fixed to standard 269. The rear end 302ᶜ of said lever carries a pin 302ª, which pin is by spring 305, fixed to bracket 304 and bearing on arm 302ᵉ, forced to bear on and follow the contour of a plate-cam 306. The inner arm 302 of said lever bends upward and carries the rod 302ᵇ, which extends normally between the yarns 292 and 293 as they issue from the leading-eyes 282 and 281, respectively. Cam 306 has an idle circular circumference of about one hundred and eighty degrees in extent, a spiral incline inward of about one hundred and fifty degrees in angular length, and a brief and straight return outward of about thirty degrees. It is so proportioned and set as that during insertion there shall be no movement of lever 302, the circular portion of the cam then passing by pin 302ª, but that the succeeding movement of shaft 201, while the parting-bar is descending, shall bring the inward incline of said cam against pin 302ª, and said pin shall draw the rod 302ᵇ outward, as in Fig. 62, with a loop of the yarn 292. When the parting-bar ascends, and during the same movement of said shaft, the straight incline of said cam acts upon said pin, which quickly returns the rod 302ᵇ to its original position, leaving the slack yarn 292 hanging in a loop from the parting-bar.

In the patent before referred to there is shown a revolving knife, circular and flat, for cutting out the reinforcing-yarn, and therein designated as 195, (Patent No. 472,029, Sheet 6, Figs. 37 and 38.) We herein show a revolving knife also; but said knife 307, Fig. 49, is formed as the flaring end of a hollow cylinder 308, which encircles the feeding-yarns, and is journaled on a hollow spindle 309ª, projecting upward from the bracket 309, which is fixed to standard 269. On cylinder 308 is also turned the pulley-groove 308ª for belt 310, which belt engages a similar groove formed on pulley 311, fixed to shaft 201. The spindle 309ª is bored as a continuation of the tube formed in cylinder 308 as a passage for the yarn to the cam-cylinder. It will be observed that when the reinforcing-yarn 292 is separated from the main yarn 293, as shown in Fig. 62, and pressed on pad 301ª by forked section 294ᵇ the former yarn will bear on and be severed by the rapidly-revolving edge of knife 307.

We employ in the present machine means for inserting the reinforcing-yarn by winding said yarn, just previous to pouch-knitting, about the main yarn. The mechanism for effecting this consists of a spiral spring 312, whose inner end is secured to the collar 313, fixed to shaft 201, and whose outer end is attached to the bolt 314, fixed in spur-gear 315, loose on shaft 201. Spur-gear 315 meshes with gear 316, made integral with gear 317, loose on standard 269. Spur-gear 317 engages gear 318, loose on stud $318^a$, fixed in bracket 309, and gear 318 meshes with the inserting-wheel 301, which is free to rotate on a bearing formed with the cylindrical uprights 319, extending from bracket 309. From the construction described it will be seen that rotation of shaft 201 will wind up spring 312 and cause rotation of inserting-wheel 301. Since shaft 201 moves both during the insertion and cutting out of yarn 292 and since the inserting-wheel 301 must rotate only during insertion, it is evident that controlling mechanism for spring 312 is essential. On the top of standard $264^a$ is secured the guide-block 320, having a guideway $320^a$ for the catch 321, pivoted at $321^b$ therein, which catch, by spring 322, secured to said guide-block, is pressed inward toward center of shaft 201 and which when in the position shown by full lines, Fig. 49, is in the path of rotation of and capable of engagement with a block $315^a$, formed on the upper surface of spur-gear 315. Since said gear could not revolve with said catch and block engaged, there is formed on the catch a lug $321^a$, which is normally in the path of rotation of a cam $311^a$, secured to the upper surface of pulley 311, as shown in Fig. 58. When said cam in its rotation meets said lug, the latter is pushed rearward, and catch 321 is disengaged from block $315^a$, permitting gear 315 to revolve. Cam $311^a$, being short, permits the catch to re-engage at once, and hence gear 315 makes but one revolution for each disengagement of said catch. Since pulley 311 advances by semi-revolutions, the cam $311^a$ is placed within that semi-circumference of said pulley which will pass beneath the catch just previous to pouch-knitting when insertion occurs. From the construction described it will be observed that just previous to the end of pouch-knitting the shaft 201 moves through a semi-revolution; but wheel 301 is stationary, since the catch is not tripped, and therefore the collar 313 winds up spring 312, adding to its initial tension; that just previous to the beginning of pouch-knitting, where insertion should occur, shaft 201 again advances, bringing cam $311^a$ against lug $321^a$, disengaging catch 321, and permitting wheel 301 to revolve. A spring is used as the primary propelling force of this mechanism merely to increase the speed of inserting-wheel 301, since the greater said speed the greater will be the force and certainty with which the yarn 292 will be thrown about the main yarn. In regard to the mechanism for producing the rotation of said wheel on alternate movements of shaft 201 it will be observed that the eccentric slide mechanism for producing the motion of shaft 201 could be adapted to produce a like result, which, with a suitable proportion of the gearing intermediate said shaft and wheel, would enable the spring 312 to be dispensed with.

On the inserting-wheel is placed a vertical clamp for yarn 292, the leaves of which flare widely to insure that said yarn will enter between them when drawn down by the parting-bar, as described. One leaf, 323, of said clamp is fixed to the wheel. The remaining leaf, 324, is formed with and secured to a slide-bar 325, moving in a guideway 326, secured also to said wheel. At its outer end the bar carries a fixed pin 327, the upper end of which is engaged by the spring 328, secured to the wheel and which tends normally to press leaf 324 against leaf 323 and produce pressure on yarn 292 when it is between said leaves. The lower end of said pin passes through a slot in the wheel and engages the camway $329^a$ of a cam 329, fixed in the cylindrical uprights 319 and beneath said wheel. Said camway is circular throughout, excepting an inward depression $329^b$, made no longer than is necessary to admit the pin 327. Said camway is so proportioned as that when said pin is in its circular portion leaf 324 will be withdrawn from leaf 323 and yarn 292 will be free to move, and that when pin 327 is in the depression $329^b$ said leaves will be pressed together and said yarn, if led between them, will be clamped. The block $315^a$ is so set as that when the inserting-wheel is at rest prior to cutting out, in the position shown in Fig. 49, said pin shall be in said depression, so that when the parting-bar descends, leading the yarn 292, as shown in Fig. 62, between the leaves, said leaves will clamp the yarn and hold it from displacement by the friction of the parting-bar in its ascent. Since, however, the yarn could not be inserted if thus attached to the wheel, the depression $329^b$ is made as short as possible, in order that simultaneously with the beginning of rotation of said wheel pin 327 shall enter the circular portion of camway $329^a$, leaf 324 shall be retracted, the yarn shall lie loosely in the groove formed by said leaves, and shall be free to withdraw therefrom when in the revolution of the wheel it shall touch the main yarn. The latter effect follows closely the beginning of rotation. The importance therefore of keeping the yarn free at this time is obvious.

The action of the take-up and reinforcing mechanisms at different periods is shown in Figs. 60, 61, and 62. During tubular knitting, as in Fig. 60, plates 283 and 290 are depressed, holding the springs 275 and 276 inactive and between tension-plates 279 and 280, respectively, thereby removing all strains due to said springs and plates from the main yarn while knitting and from the reinforcing-yarn when its time for insertion arrives, said reinforcing-yarn drooping in a loop from forked section 294$^b$ of the parting-bar, with its end clamped between the leaves 323 324; the slackening-rod 302$^b$ is inactive and between the yarns, and the parting-bar is elevated and closed. In Fig. 61, which shows the positions while inserting movements are in progress, plate 283 has been elevated, leaving the take-up spring 275 free to act on the main yarn; plate 290 is about to rise, but is still depressed, thus avoiding strain on the reinforcing-yarn before the latter adheres closely to the main yarn; the slackening-rod and parting-bar are motionless, as before, and the inserting-wheel has completed one or more revolutions and has thrown yarn 292 against and around the main yarn. It will be observed that, while the gearing between the inserting-wheel and shaft 201 is so proportioned as that said wheel shall make three revolutions to the one made by gear 315, this proportion is given not to obtain that number of said revolutions for the wheel in inserting, (since the latter operation is usually effected in less than one revolution,) but to give the wheel high speed. In Fig. 62, in which are shown the positions at the moment of cutting out the reinforcing-yarn, plate 283 has been depressed, again removing all tension from the main yarn; plate 290 is about to descend, thereby increasing the amount of slack yarn over that already drawn by the slackening-rod through spring 276; the parting-bar has been depressed, its single section 294 passing between knife 307 and clamp 323 and 324, and its forked section passing beyond said clamp and holding the reinforcing-yarn firmly on pad 301$^a$, while the combined action of the two sections has been to lead said yarn through the clamp, and the rotating knife 307 is about to sever the yarn thus held by the parting-bar. Before this movement of shaft 201 ceases the parts described leave the positions shown in Fig. 62 and assume those shown in Fig. 60.

In regard of the work done by shaft 201 it will be observed that the speed of said shaft admits of variation without effecting the results above described, providing that with such variation corresponding changes be made in the contour of the cams operated by said shaft. We do not desire, therefore, to limit ourselves to the exact forms of said cams herein described. The change in speed referred to can be made most conveniently by altering the diameter of sprocket-wheel 264.

In Figs. 66 to 69, inclusive, is shown a modification of a portion of the shaping mechanism to fit it for adjusting the height only of a stitch-cam, the adjustment to be normally effected. The cam-cylinder 330 therein shown is of a well-known type. It is provided with a stationary rest-cam 331 and stitch-cams 332 and 332$^a$, the modification being shown as applied to stitch-cam 332, pivoted switches 333 333$^a$, controlling the entrances to cam-grooves between cams 332, 332$^a$, and 331, and an upper depressing-cam 334, which is capable of limited reciprocation horizontally through bolts 334$^a$, fixed in said cam and entering oblong slots 330$^a$ in cam-cylinder. Cam 332 is capable of limited vertical reciprocation, as shown by full and dotted positions in Fig. 66, the range, however, being for clearness exaggerated. Said cam is rigidly secured by bolts 335 to rectangular guide-rod 337, said bolts passing through slot 336, oblong vertically, cut through the wall of the cam-cylinder. The guide-rod reciprocates vertically in rectangular guideways 338 and 339, formed, respectively, in cam-cylinder 330 and in guide-block 340, firmly secured to flange 341 of the cam-cylinder. The lower end of the guide-rod is rounded to provide a flange, between which and flange 341 the spring 342 shall act to sustain and press upward the guide-rod and its attached cam. The upper end of said rod is formed as a semi-globular extension 343, which presses against the cam-surface 344 of a cam-disk 345. As shown in Fig. 69, the cam-surface 344 is formed as a continuous incline throughout its circumference. The disk is loose on a stud 346, fixed in guide-block 340, and is kept in position vertically thereon by a cap 347, bolted to said stud. Radial slots 345$^a$ are cut in cam-disk 345, with which a catch 348 is capable of engagement, and said catch moves in a guideway 348$^a$, formed in block 340, is pivoted at 348$^b$ in said guideway, and is pressed into engagement with slots 345$^a$ by spring 349, fixed to the guide-block and engaging catch. From the construction described it will be observed that if said catch is disengaged and the disk manually rotated there will be, according to the direction of said rotation, either a depression of the stitch-cam through the pressure of the cam-disk on the guide-rod or a rise of said cam through the cam-disk, permitting the spring to elevate the guide-rod. It will also be noticed that in this modification we omit the filling-block described hereinbefore as applied to the stitch-cam and attach the cam directly to the guide-rod. The modified form just described is of more economical construction, and its use or that of the form previously described is optional with the shaping mechanism or for regulating the height only of the stitch-cam. The adjusting mechanism is of much advantage, not only with the form of knitting-machine shown and described in this case, but with others, in preserving the even texture of the fabric.

In Figs. 66, 70, 71, and 72 is shown mechanism for freeing the needle-butts from the knitting-cams when it is desired to remove the needle-cylinder with its needles. The needles used with the present machine are identical with those described in the patent before referred to (No. 472,029, Sheet 2, Fig. 7) and therein designated as 23, with their knitting-butts as 23$^g$. In removing the needle-cylinder with its needles the fashioning butts are first disengaged from the automatic mechanism, as described in the patent referred to. The knitting-butts must then be disengaged from the cams 332, 332$^a$, and 334.

To effect this, there is inserted an incline or inclined cam 350 in a diagonal slot cut in the wall of cam-cylinder 330, said incline being of sufficient length to span the space between the rest-cam 331 and the top of the depressing-cam 334, the position of said depressing-cam being that shown in Fig. 66 for motion in the direction indicated by the arrow A, said figure. It will be seen that the entrance to the path between cams 332 and 334 is guarded and that the course of the knitting-butts will be that indicated by arrow B, Fig. 66—i. e., from rest-cam 331 up incline 350, over depressing-cam 334, and down again to rest-cam. In this position the knitting-butts are out of engagement with the knitting-cams, and the cylinder and needles can be readily removed. Cam 350 is bolted to the ∠-shaped guide-block 351, which is capable of reciprocation in guide-ways 352, formed on flange 341 of the cam-cylinder and being retained therein by caps 353, bolted to said guideway. A retaining-pin 354 passes through block 351 and into either of two holes 355, drilled in said flange. It will be understood that if knitting-block 351 is drawn outward pin 354 is set in outer hole 355 and incline 350 is retracted within the groove formed in the cam-cylinder, in order that there may be no resistance to the needle-butts. When it is desired to remove the needle-cylinder with its needles, there are lifted a brief distance one or two of the latter, whose butts would interfere with the passage inward of the lower end $350^a$ of the incline 350. Then pin 354 is elevated; block 351 and incline 350 are manually pushed inward until the inner surface of said incline is flush with that of the knitting-cams; pin 354 is dropped into inner hole 355, and the machine is driven manually or by power until the knitting-butts which are engaged with the knitting-cams are freed therefrom. The incline 350 is then withdrawn, and, when desired, the needle-cylinder is replaced in the usual manner. This method is applicable to reciprocating needles of any type and is of especial service with such needles as are not spring-pressed into contact with the sides of the grooves of needle-cylinder, so as that they may retain any position vertically to which they are moved, since said needles, if not lifted immediately in advance of the depressing-cam 334, are liable to drop and engage said cam.

In Fig. 73 is shown a modification of the reciprocating driving mechanism for the cam-cylinder. In this construction shaft 9, expanding-crank 10, link 12, shaft 16, spur-gears 15 and 34, and crank-gear 14 are the same in all respects as previously described, excepting that said crank-gear is loose on shaft 18, is provided with a downward extension and flange $14^a$, through which it is supported on and guided in the auxiliary table 356, and that its hub $14^b$ is prolonged and formed with a lug $14^c$, constituting one member of a clutch, which member is capable of engagement with, and rotation by a complementary member or lug $357^a$, formed with a hub 357, which hub rotates with shaft 18, but is capable of axial movement thereon through feather 358, set in said shaft and engaging a guideway in said hub 357.

Shaft 9 may be driven by any suitable mechanism, as that before described, or by a pulley 359 fixed to it. To the upper end of said shaft is pinned the expanding-crank 10, which, through link 12, drives crank-gear 14, as previously described. Said gear engages spur-gear 15, fixed to shaft 16, which, as stated, is geared to cam-cylinder. On shaft 9 is fixed spur-gear 34, meshing with gear 360, fixed to shaft 361, which gear 360 engages spur-gear 362, fixed to shaft 18. On shaft 361 is pinned cam 363, whose camway $363^a$ engages and vertically reciprocates a combined clutch-collar and slide-bar 364, the annular portion of which encircles and reciprocates the clutch-hub 357, provided with clutch-lug $357^a$, while the plane extension $364^a$ of collar and bar 364 is guided in a bracket 365, fixed to base-plate 5, and is kept thereon by cap $365^a$ bolted thereto. The expanding-crank 10 engages in the manner previously described the switch-plate 24, which plate is secured to auxiliary table 356 by screws $24^a$, said table being in turn secured to the base-plate by bolts $356^a$. If spur-gears 34, 360, and 362 are equal in diameter, camway $363^a$ will be similar in all respects to cam-way 43 of cam 44 before described.

From the construction described it will be observed that crank 10 continuously drives crank-gear 14 and the mechanism engaged by it; that the continuously-revolving cam 363 will, during every revolution of shaft 18, give to clutch member 357 a reciprocation, thus engaging lugs $357^a$ and $14^c$ while crank-gear 14 is passing its dead-points, and that shaft 18 will then aid in driving said gear; that in pouch-knitting, while the member 357 is still reciprocated vertically the complementary member $14^c$ is reciprocating in a horizontal path, in passing which the lug $357^a$ is at the lower limit of its vertical stroke and therefore out of range of said lug $14^c$.

It is evident that clutch members $14^c$ and $357^a$, guide-rod and collar 364 $364^a$, and cam 363 are in combination equivalent in function to the pin 46, block 41, crank 38, and cam 44 previously described. The essential points of difference between the modified and original mechanisms are that in the latter the clutch-actuating cam 44 is stationary and the connection, pin 42, between it and the clutch member, block 41, both revolves and reciprocates vertically, while in the modification the clutch-actuating cam 363 revolves and the connection, collar 364, between it and said clutch member reciprocates only, though in a vertical direction. It is not essential that the speed of cam 363 shall be identical with that of shafts 9 and 18—as, for example, said cam may have a speed of one-half that of said shafts, in which case the entire camway 363ª would occupy one hundred and eighty degrees only of the circumference of said cam and the remaining one hundred and eighty degrees would be occupied by a duplicate.

In Fig. 74 is shown a modification of the devices for producing the changes necessary in the various parts of the mechanism just previous to the beginning and to the end of pouch-knitting. At each of these times the shaft 166 makes a semi revolution, and thereby, through the link 171 and the eccentric slides 115 and 173, indicates the semi-revolution, produced immediately thereafter, of jack-holder cam 103 and of the shaft 201 of the yarn-splicing and take-up mechanism. While the construction described gives the widest and most convenient range for adjusting these motions as to sequence and duration, it will be observed that the power of the change-shaft mechanism and the said sequence and duration are such that it is possible to effect, and not to indicate, the motions referred to through the movements of shaft 166. Hence in Fig. 74 we show the jack-holder cam 103 as fixed to said shaft, with, as before, the eccentric 167 for actuating the switch 26 of switch-plate 24, and with, also, a sprocket-wheel 365, which, through a similar sprocket-wheel, fixed in this modification to shaft 201, and a connecting-chain, (both latter not shown,) will connect shafts 166 and 201. With this construction the changes required will all be effected by the movements of shaft 166, which movements are previously produced by ratchet 154, actuated by pawl 148. In the latter respect, as in its motion, the shaft 166, as modified, resembles the change-shaft shown by us in the patent above referred to, and therein designated as No. 103, the motion of which is previously produced by that of ratchet therein designated as No. 106, (Patent No. 472,029, Sheet 5, Figs. 23 and 24,) and which shaft advances by semi-revolutions.

What we claim is—

1. The combination with a knitting-machine cylinder or head, two crank-shafts, one of which is provided with a crank of variable throw, a connection between the cranks through which motion is transmitted from one crank-shaft to the other, and gearing between the driven crank-shaft and the said cylinder or head, of guide-ways located at different distances from the center of rotation of the variable crank and constructed to co-operate with a connection of the said crank, and shifting devices for transferring said connection from one of said ways to the other, substantially as described.

2. The combination with a knitting-machine cylinder or head, two crank-shafts, one of which is provided with a crank of variable throw, a connection between the cranks through which motion is transmitted from one crank-shaft to the other, and gearing between the driven crank-shaft and the said cylinder or head, of the switch-plate having guide-ways located at different distances from the center of rotation of the variable crank and co-operating with a connection of the said crank, and the switch for transferring said connection from one guideway to the other, substantially as described.

3. The combination with a crank-arm, of a crank-pin movable radially thereof, a pin 21 or the like connected with the said crank-pin, a switch-plate having guide ways 22 and 24 at different distances from the center of rotation of said crank-arm, and a switch for transferring said pin or projection from one of said guide ways to the other, substantially as described.

4. The combination with a crank-arm, of a crank-pin movable radially thereof, a pin 21 or the like connected with the said crank-pin, a switch-plate having guideways 22 and 24 at different distances from the center of rotation of said crank-arm and other guide ways 32 and 33, lugs 30 and 31 connected with said crank-pin and co-operating with said guide-ways 32 and 33, and a switch for shifting the crank-pin radially, substantially as described.

5. The combination with a knitting-machine cylinder or head, two crank-shafts, one of which is provided with a crank of variable throw, means for varying the effective length of such crank, a connection between the cranks through which motion is transmitted from one crank-shaft to the other, and gearing between one of said crank-shafts and the said cylinder or head, of auxiliary driving gear, for carrying the driven crank over its dead points, comprising an intermittent clutch which is closed when the said driven crank is at the dead points and open at other times, one of the members of said clutch having operative connections with the driven crank and the other member having connections whereby it is rotated in unison with the driving crank, substantially as described.

6. The combination with the two crank-shafts, one thereof having a crank of variable throw, means for varying the effective length of such crank, and a connection between the cranks through which motion is transmitted from one crank-shaft to the other, of auxiliary driving gear, for carrying the driven crank over its dead points, comprising clutch devices having one member of the same in operative connection with the driven crank, the other member having actuating connections whereby it is rotated in unison with the driving crank, and a cam which effects the closing of the clutch when said driven crank is in proximity to its dead points, and the opening thereof at other times, substantially as described.

7. The combination with two crank-shafts, and a connection between the cranks through which movement of rotation is transmitted from one crank-shaft to the other, of auxiliary driving gear for carrying the driven crank over its dead points comprising an intermittent clutch which is closed when the said driven crank is at the dead points and open at other times, one of the members of said clutch having operative connections whereby it is rotated in unison with the driving crank, substantially as described.

8. The combination with a driven crank-shaft, and devices connected with the crank thereof for communicating to the crank-shaft both an oscillating movement and a continuous rotation, of auxiliary driving gear for carrying the crank over its dead points, while it is being continuously rotated, comprising an intermittent clutch which is closed when the said crank is at the dead points and open at other times, one of the members of said clutch having operating connection with the crank and the other member having connections whereby it is rotated at the same speed with the crank, substantially as described.

9. The combination with indicating devices controlling the action of the needles in narrowing and widening, and the wheel 50 from which said devices are actuated, of the variable crank and clutching devices connected with said crank and wheel, whereby in one position of adjustment of the said crank the wheel 50 is caused to rotate in unison therewith, substantially as described.

10. The combination with a variable crank, of the lug or projection 31 carried thereby, the wheel 50 having lug 51 adapted to be engaged by said lug or projection in one position of adjustment of the said crank, and indicating devices having operative connection with said wheel 50 and controlling the action of the needles in narrowing and widening, substantially as described.

11. The combination with the two indicating cams, of the two indicating shafts, means for moving said shafts in opposite directions with respect to each other and at different times, and mechanism intermediate the shafts and indicating cams whereby each of the latter at predetermined times is connected with the shaft giving it the required motion in time and direction, the operative relations between the respective cams and the respective shafts being alternated, substantially as described.

12. The combination with the indicating cams, of indicating shafts, transmitting mechanism whereby the said cams may be actuated from said shafts in opposite directions to each other, and devices whereby at predetermined times the operative connections between the respective cams and the respective shafts may be alternated and thereby the movements of the indicating cams may be reversed, substantially as described.

13. The combination with the indicating cams, of the indicating shafts, gear trains intermediate each shaft and both cams, clutching devices, and devices for actuating the clutching devices to place the respective cams alternately in driving connection with the respective shafts, the said cams thereby being moved oppositely with relation to each other, and each cam being carried first in one direction and then in the other, substantially as described.

14. The combination with the indicating cams, of indicating shafts, loose gears mounted on said shafts and in gear-connection with the indicating cams, clutches whereby the gears on each shaft may be locked alternately to said shaft, and actuating devices for said clutches whereby first one cam may be placed in driving connection with one shaft and the other cam in driving connection with the other shaft and then the driving connections between the respective cams and shafts may be alternated, substantially as described.

15. The combination with the indicating cams, of carrier-gears in gear connection therewith, indicating shafts, loose gears mounted on said shafts and in gear connection with said carrier-gears, clutches whereby the gears on each shaft may be locked alternately to said shaft, and actuating devices for said clutches whereby first one cam may be placed in driving connection with one shaft and the other cam in driving connection with the other shaft and then the driving connections between the respective cams and shafts may be alternated, substantially as described.

16. The combination with the indicating cams, of indicating shafts, loose gears mounted on each of said shafts and respectively in gear-connection with the respective indicating cams, clutches whereby the gears on each shaft may be locked alternately to said shafts, cam slides each of which is connected with the clutches for one shaft, and a cam having opposite grades of different levels acting upon said cam slides to cause first one cam to be placed in driving connection with one shaft and the other cam in driving connection with the other shaft, through one half-revolution of the cam, and then to reverse the driving connections between the respective cams and shafts through the remaining half-revolution of the cam, substantially as described.

17. The combination with the indicating cams, of carrier-gears in gear-connection therewith, indicating shafts, loose gears mounted on said shafts and in gear-connection with said carrier-gears, clutches whereby the gears on each shaft may be locked alternately to said shaft, cam slides each of which is connected with the clutches for one shaft, and a cam having opposite grades of different levels acting upon said cam slides to cause first one cam to be placed in driving connection with one shaft and the other cam in driving connection with the other shaft through one-half revolution of the cam and then to reverse the driving connection between the respective cams and shafts through the remaining half-revolution, substantially as described.

18. The combination with the indicating cams, of indicating shafts, loose gears mounted on said shafts and in gear connection with the indicating cams, clutches whereby the gears on each shaft may be locked alternately to said shaft, cam slides each of which is connected with the clutches for one shaft, a cam having opposite grades of different levels acting upon said cam slides to cause first one cam to be placed in driving connection with one shaft and the other cam in driving connection with the other shaft through one half-revolution of the cam, and then to reverse the driving connections between the respective cams and shafts through the remaining half-revolution of the cam, means for rotating said cam, and devices for imparting intermittent movements to said indicating shafts alternately, substantially as described.

19. The combination with the indicating cams, of carrier gears in gear connection therewith, indicating shafts, loose gears mounted on said shafts and in gear connection with said carrier-gears, clutches whereby the gears on each shaft may be locked alternately to said shaft, cam slides each of which is connected with the clutches of one shaft, a cam having opposite grades of different levels acting upon said cam slides to cause first one cam to be placed in driving connection with one shaft and the other cam in driving connection with the other shaft through one half-revolution of the cam, and then to reverse the driving connections between the respective cams and shafts through the remaining half-revolution of the cam, means for rotating said cam, and devices for imparting intermittent movements to said indicating shafts alternately, substantially as described.

20. The combination with shifting means acting in connection with a body of needles, of stop-motion devices, and connecting mechanism intermediate the shifting means and stop-motion devices whereby when the said shifting means is actuated to shift the said body of needles into operative position the stop-motion devices are actuated, substantially as described.

21. The combination with shifting means for placing a body of needles *en masse* in or out of operative position, stop-motion devices, and mechanism actuating the said stop-motion devices and operated by the shifting means as the latter moves the said body of needles into operative position, substantially as described.

22. The combination with a needle-shifting device, and a dog or pawl moving in unison therewith, of stop-motion devices, and mechanism actuating the latter and including a toothed member which is engaged and moved by the said dog or pawl to cause the stop-motion devices to act, substantially as described.

23. The combination with the device for placing a body of needles *en masse* in or out of operative position, and the dog or pawl moving in unison therewith, of the shipper-handle, and the latching and unlatching devices including a toothed member which is engaged and moved by the said dog or pawl to effect the unlatching, substantially as described.

24. The combination with a needle-shifting device to place a body of needles in or out of operative position, and actuating devices therefor including a disconnectible coupling, of stop-motion devices connected with the said coupling and operating to disconnect the needle-shifting device, substantially as described.

25. The combination with the device for placing a body of needles *en masse* in or out of operative position, and its actuating connections whereby it is moved automatically at the required times in the operation of the machine, the said connections including a disconnectible coupling, of stop-motion devices actuated from said device and connected with said coupling whereby to disconnect the latter, substantially as described.

26. The combination with the device for placing a body of needles *en masse* in or out of operative position, its actuating cam in operative connection therewith, and driving mechanism for said cam including a clutch, of controlling means effecting the closing of the clutch and subsequent opening of the same after a partial revolution and thereby intermittingly occasioning partial rotations of the said cam, the said controlling means comprising a movable piece having a curved guide for one of the members of the clutch, and the position of the said movable piece determining the times of the mutual engagement of the clutch members, substantially as described.

27. The combination with the device for placing a body of needles *en masse* in or out of operative position, and its actuating cam, of driving mechanism for said cam including a clutch having one of the members thereof equipped with a radially movable engaging piece, and controlling mechanism comprising a movable piece having a curved guide for said radially movable engaging piece, and also pattern-devices connected with said movable piece, substantially as described.

28. The combination with a shaft, and mechanism substantially as described connected therewith to effect the changes from plain knitting to pouch knitting and vice versa, of a ratchet-wheel in operative connection with said shaft, a pawl to engage said ratchet-wheel to rotate the same, means to move the said pawl, a chain having spikes projecting over said ratchet wheel to determine the times of the engagement of the pawl with the ratchet wheel, and means to feed the said chain, substantially as described.

29. The combination with a variable crank, a device to move needles *en masse* out of and into operative position, clutch-mechanism whereby such device may be actuated, yarn-controlling devices, and clutch mechanism whereby the said devices may be actuated, of the switch controlling the action of the said crank, the slides controlling the said clutch mechanism, and the change-shaft having connections with the said slides and switch whereby it actuates the same, substantially as described.

30. The combination with change mechanism, and the ratchet-wheel 154 operatively connected therewith, of the chain having spikes projecting laterally over said ratchet-wheel, a carrier-wheel for said chain, a second ratchet-wheel which is connected to turn with said carrier-wheel, pawls to engage said ratchet-wheels, means to actuate said pawls, and a masked ratchet having two full teeth in succession and co-operating with the actuating pawl of said second ratchet-wheel, substantially as described.

31. The combination with the stitch-cam and the filling block with which the same is connected, of the guide rod with which the said filling block is connected, the guide within which said guide-rod is fitted with capacity to move endwise, the rotary adjusting cam acting on one end of said guide rod and by which the position of the stitch-cam is varied and means whereby a step-by-step rotary adjustment may be given to said adjusting cam in order to produce different lengths of stitches, substantially as described.

32. The combination with the stitch-cam, of the rotary adjusting cam by which the position of the stitch-cam is varied, the shaft on which said adjusting-cam is mounted, and the tapered key whereby adjustment of the adjusting-cam on its shaft may be effected, substantially as described.

33. The combination with the stitch-cam, of the rotary adjusting cam by which the position of the stitch-cam is varied, the ratchet-wheel 206, the gear-wheels by which motion is transmitted from the ratchet-wheel to the adjusting cam, the pawl engaging said ratchet-wheel, the pawl-carrier, the pin 213 acting when projected to move the pawl-carrier, and pattern-devices controlling the times at which the said pin shall co-act with the pawl-carrier, substantially as described.

34. The combination with the stitch-cam, of the rotary adjusting cam by which the position of the stitch-cam is varied, the ratchet-wheel in operative connection with the adjusting cam, the pawl engaging said ratchet-wheel, and the pawl-carrier, of the spring-pressed pin 213 acting when projected to move the pawl-carrier, means for retracting the said pin against the action of its spring, the locking device co-acting with said pin to hold it retracted, and means for disengaging said locking device, substantially as described.

35. The combination with the stitch-cam, of the rotary adjusting cam by which the position of the stitch-cam is varied, the ratchet-wheel in operative connection with the adjusting cam, the pawl engaging said ratchet-wheel, and the pawl-carrier, of the spring-pressed pin 213 acting when projected to move the pawl-carrier, the cam 226 to retract said pin, the lever which locks said pin in retracted position, and pattern devices for moving said locking lever to release the pin, substantially as described.

36. The combination with thread-controlling devices substantially as described, and a shaft having operative connection with such devices, of devices giving intermittent rotary movement to said shaft and comprising a diametrically movable piece connected with said shaft to rotate in unison therewith and provided with an engaging projection, a rotating driver having diametrically opposite projections for co-operation with said projection, a slide having a guide-way in continuous engagement with said diametrically movable piece, and devices for shifting said slide, substantially as described.

37. The combination with a take-up arm, and tension plates, of a rock-shaft, a plate carried thereby, and means for moving said rock-shaft and causing the said plate to act upon and press the said take-up arm between the said plates and thereby open the latter, substantially as described.

38. The combination with take-up arms and tension plates for the main yarn and auxiliary yarn, of a rock-shaft, plates carried thereby, and means for moving said rock-shaft and causing the said plates to depress the take-up arms and open the said plates with a lead of the plate of the main yarn over that of the auxiliary yarn in both directions, substantially as described.

39. The combination with take-up arms and tension plates for the main yarn and auxiliary yarn, of a rock-shaft, plates carried thereby, and means for moving said rock-shaft and causing the said plates to depress the take-up arms and open the said plates, the plate of the auxiliary yarn having provisions for lost motion in its connections with the rock-shaft to give a lead to the plate of the main yarn, substantially as described.

40. The combination with tension and take-up devices for an auxiliary yarn, and devices whereby said yarn is applied to the main yarn or disconnected, of a yarn-slackener engaging with said auxiliary yarn at a point intermediate the two sets of devices, substantially as described.

41. The combination with a rotatory inserting device for the auxiliary yarn having means for holding the free end of said yarn, of a guiding and clamping bar, and means to actuate said bar, whereby the auxiliary yarn is carried to the main yarn and afterward is applied to said holding means and also clamped against the inserting device to arrest its flow, substantially as described.

42. The combination with the inserting wheel, its clamp, and its surface against which the auxiliary yarn is compressed by the guiding and clamping bar, and means for intermittingly rotating said wheel, of the said guiding and clamping bar, and actuating devices for said bar, substantially as described.

43. The combination with the inserting wheel, controlling devices substantially as described for the auxiliary yarn, the shaft 201, means for operating said wheel and controlling devices from said shaft, means for imparting rotatory movements to said shaft at predetermined intervals in the knitting, and means for determining the times at which the inserting wheel shall be rotated from the said shaft, substantially as described.

44. The combination with the inserting wheel, the shaft 201, means for transmitting rotation from the shaft to the inserting wheel, including a loose wheel 315 and spring driver 312, a detent normally holding the wheel 315 from rotatory movement, and a device for disengaging said detent at the required moment in the operation of shaft 201, substantially as described.

45. The combination with the inserting wheel, the shaft 201, means for rotating said wheel from said shaft including a loose wheel 315 and a spring-driver 312, and a detent 321 which holds said loose wheel from rotating, of wheel 311 carrying a cam which engages with said detent to free the wheel 315 and enable the stored-up energy of the spring-driver to act in rotating the inserting wheel, substantially as described.

46. The combination with guides for the main yarn, of devices substantially as described controlling the auxiliary yarn, and a cylindrical knife through the center of which the yarns proceed, substantially as described.

47. The combination with the inserting wheel, and controlling devices substantially as described for the auxiliary yarn, of the hollow cylindrical knife at the center of said wheel, substantially as described.

48. The combination with the parting bar, and its actuating devices, the inserting wheel, means for rotating said wheel, its yarn clamp, and its surface for co-action with the parting bar in holding the auxiliary yarn while being severed of the hollow cylindrical knife at the center of the inserting wheel, substantially as described.

In testimony whereof we affix our signature in presence of two witnesses.

WILLIAM L. CATHCART.
ALEXANDER T. CATHCART.

Witnesses:
  JOS. B. QUIGLEY,
  G. W. BURR.